(12) United States Patent

Gu et al.

(10) Patent No.: US 12,574,705 B2

(45) Date of Patent: *Mar. 10, 2026

(54) TRANSMITTING DIGITAL TRANSPORTATION REQUESTS ACROSS MODES TO LIMITED-ELIGIBILITY PROVIDER DEVICES TO IMPROVE NETWORK COVERAGE AND SYSTEM EFFICIENCY

(71) Applicant: Lyft, Inc., San Francisco, CA (US)

(72) Inventors: Janie Jia Gu, San Francisco, CA (US); Arman Jabbari, Seattle, WA (US); Wilson James Turner, Dedham, MA (US); Arthur Jean Francois Braud, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 18/048,524

(22) Filed: Oct. 21, 2022

(65) Prior Publication Data

US 2023/0076582 A1     Mar. 9, 2023

Related U.S. Application Data

(63) Continuation of application No. 17/407,841, filed on Aug. 20, 2021.

(51) Int. Cl.
*H04W 4/02* (2018.01)
*G06N 3/09* (2023.01)
(Continued)

(52) U.S. Cl.
CPC .............. *H04W 4/023* (2013.01); *G06N 3/09* (2023.01); *G06N 20/00* (2019.01); *H04W 8/02* (2013.01); *G06Q 10/02* (2013.01)

(58) Field of Classification Search
CPC .......... H04W 4/023; H04W 8/02; G06N 3/09; G06N 20/00; G06N 3/045; G06Q 10/02; G06Q 50/40; G06Q 10/06
See application file for complete search history.

(56) References Cited

U.S. PATENT DOCUMENTS 10,152,053 B1    12/2018  Smith et al.
2015/0161564 A1*  6/2015  Sweeney .......... G06Q 10/08355
                                               705/338

(Continued)

OTHER PUBLICATIONS

U.S. Appl. No. 17/407,841, Nov. 7, 2024, Office Action.
U.S. Appl. No. 17/407,841, Feb. 12, 2025, Office Action.
U.S. Appl. No. 17/407,841, May 27, 2025, Notice of Allowance.

*Primary Examiner* — Kathy W Wang-Hurst
(74) *Attorney, Agent, or Firm* — Keller Preece PLLC

(57) ABSTRACT

This disclosure describes a request distribution system that can intelligently distribute transportation requests to provider devices to improve transportation system network coverage and efficiency. For example, the disclosed systems can identify a transportation request corresponding to a first transportation mode and analyze multiple limited-eligibility provider devices having various modes as potential recipients for the transportation request. In some embodiments, the disclosed systems can further determine an expected change in network coverage time associated with providing the transportation request to a first provider device corresponding to the first transportation mode versus a second provider device corresponding to a second transportation mode. The disclosed systems can provide the transportation request to the second provider device corresponding to the second transportation mode according to the expected change in network coverage time and/or other transportation request metrics.

20 Claims, 13 Drawing Sheets

(51) Int. Cl.
  G06N 20/00    (2019.01)
  H04W 8/02    (2009.01)
  *G06Q 10/02*    (2012.01)

(56) References Cited

U.S. PATENT DOCUMENTS

| | | |
|---|---|---|
| 2016/0247096 A1 | 8/2016 | Scicluna et al. |
| 2017/0148229 A1 | 5/2017 | Marco et al. |
| 2018/0159946 A1* | 6/2018 | Barreto ................... H04L 67/04 |
| 2019/0051174 A1 | 2/2019 | Haque et al. |
| 2019/0205812 A1 | 7/2019 | Afzal et al. |
| 2019/0206008 A1* | 7/2019 | Dutta ..................... G06N 20/20 |
| 2020/0175632 A1 | 6/2020 | Vora et al. |
| 2020/0219220 A1 | 7/2020 | Levi |
| 2021/0192663 A1 | 6/2021 | Spielman et al. |
| 2022/0318719 A1 | 10/2022 | Dhingra et al. |
| 2023/0039994 A1* | 2/2023 | Kumar ................. G01C 21/343 |

* cited by examiner

1000

| Receiving A Transportation Request | 1002 |

| Determining An Expected Change In Network Coverage Time | 1006 |

| Providing A Transportation Request Notification A Provider Device | 1008 |

1200

Transportation Matching System
*102*

Vehicle Subsystem *1208*

Network
*1204*

Client Device *1206*

TRANSMITTING DIGITAL TRANSPORTATION REQUESTS ACROSS MODES TO LIMITED-ELIGIBILITY PROVIDER DEVICES TO IMPROVE NETWORK COVERAGE AND SYSTEM EFFICIENCY

CROSS-REFERENCE TO RELATED APPLICATION

The present application is a continuation of U.S. application Ser. No. 17/407,841, filed on Aug. 20, 2021. The aforementioned application is hereby incorporated by reference in its entirety.

BACKGROUND

In recent years, both popularity and usage of on-demand transportation information systems have increased. Indeed, the proliferation of web and mobile applications has enabled requesting devices to utilize on-demand ride sharing systems to identify matches between provider devices and requester devices and coordinate across computer networks to initiate transportation from one geographic location to another. For instance, conventional transportation network systems can determine geographic locations of provider devices and requester devices, generate digital matches between provider devices and requester devices, and further track, analyze, and manage pick-up, transportation, and drop-off routines through digital transmissions across computer networks. Despite these recent advances, however, conventional transportation network systems continue to exhibit a number of drawbacks or deficiencies.

For example, some conventional transportation network systems experience poor network coverage, leading to system inefficiencies. Indeed, existing systems often have imbalances between requester devices and provider devices that lead to inadequate network coverage over one or more geographic regions. For instance, the resources available to existing transportation network systems for servicing transportation requests constantly fluctuate, and existing systems sometimes receive large numbers of transportation requests. In many cases, if an existing system receives a large number of transportation requests in a particular geographic region that has too few resources for sufficient coverage, the system expends significantly more computational resources per transportation request (e.g., to transmit navigation instructions for longer periods of time, to repeatedly run matching algorithms, and/or to process repetitive digital request cancelations). Thus, conventional systems often expend significant computing resources due to device imbalances and poor provider device network coverage.

These, along with additional problems and issues, exist with conventional transportation network systems.

SUMMARY

This disclosure describes one or more embodiments of methods, non-transitory computer-readable media, and systems that can solve the foregoing problems in addition to providing other benefits by intelligently distributing transportation requests to provider devices to improve transportation system network coverage and efficiency. For example, the disclosed systems can identify online provider devices and/or limited-eligibility provider devices based on provider device statuses and/or whether the provider devices are running an application associated with the transportation request. In some embodiments, the disclosed systems can further determine an expected change in network coverage time (e.g., provider hours from limited-eligibility provider devices and/or full-eligibility provider devices) associated with providing the transportation request to a provider device. Based on the expected change in network coverage time (and/or other transportation request metrics), the disclosed systems can provide the transportation request to a provider device. In this manner, the disclosed systems can flexibly utilize intelligently targeted digital notifications to computing devices (e.g., offline and online computing devices) to improve system network coverage and overall system efficiency without undermining the efficiency of requester devices and other provider devices already operating within the system.

BRIEF DESCRIPTION OF THE DRAWINGS

The detailed description refers to the drawings briefly described below.

DETAILED DESCRIPTION

Figure 1:
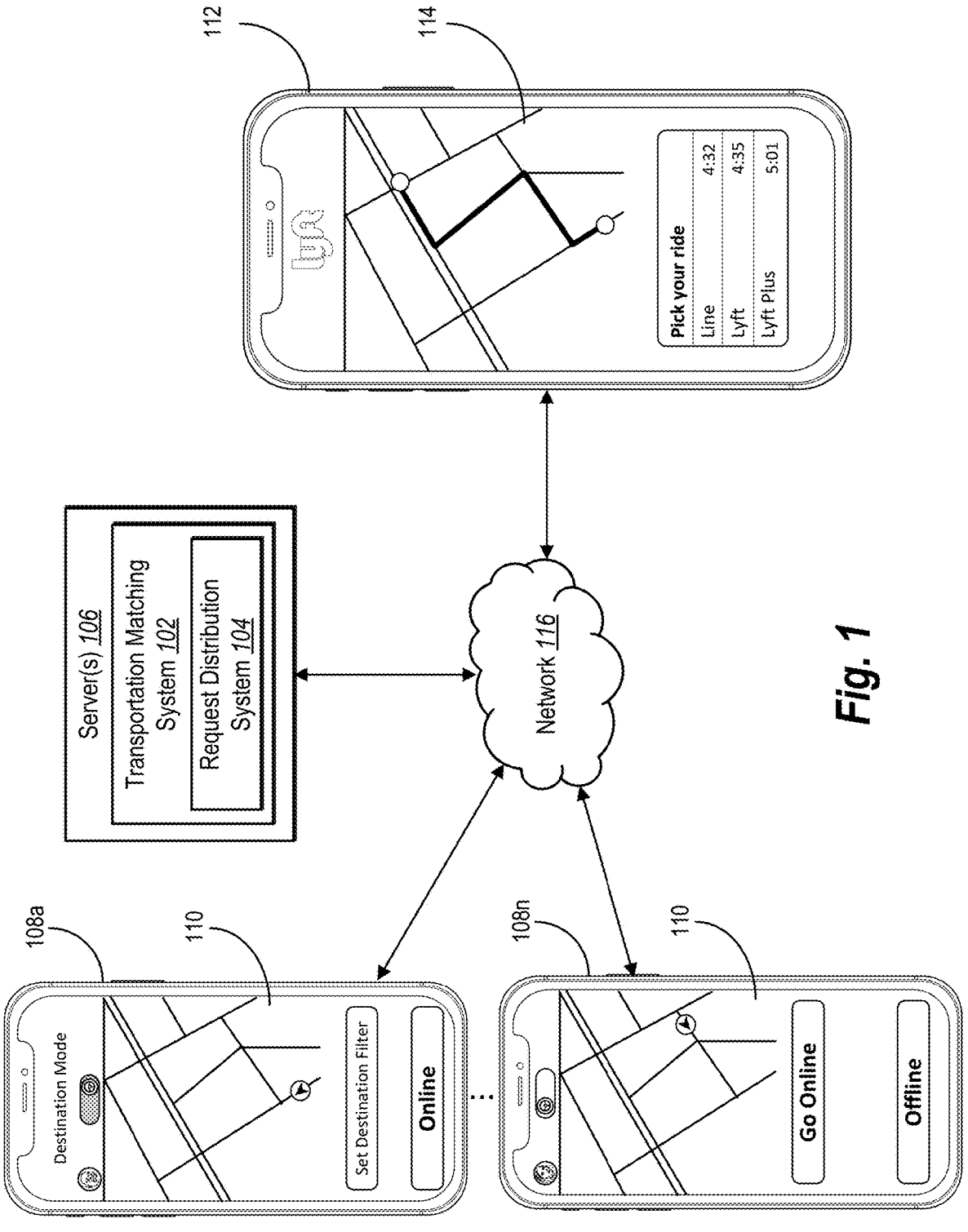
FIG. 1 illustrates a block diagram of an environment for implementing a transportation matching system and a request distribution system in accordance with one or more embodiments.

This disclosure describes a request distribution system that can intelligently distribute or provide transportation requests to provider devices to balance network coverage and improve system efficiency. To elaborate, the request distribution system can identify provider devices such as online provider devices, limited-eligibility provider devices, and/or full-eligibility provider devices associated with a transportation matching system. The request distribution system can further determine and compare different transportation request metrics for a received transportation request in relation to the provider devices. For instance, the request distribution system can predict expected changes in network coverage time on a per-device basis, where providing a transportation request to one provider device results in a different expected change in network coverage time than providing the transportation request to a different provider device. In certain embodiments, the request distribution system further provides the transportation request to a selected provider device based on the expected change in network coverage time. For instance, the request distribution system provides the transportation request to a particular provider device to improve system network coverage, reduce computing device imbalances, and increase overall system efficiency. Moreover, the request distribution system can intelligently track requester devices and provider devices already operating within a transportation matching system to dynamically provide transportation requests to provider devices without undermining the efficiency of other requester/provider devices.

As just mentioned, the request distribution system can distribute transportation requests based on expected changes in network coverage time. To elaborate, the request distribution system can determine an expected change in network coverage time in the form of an expected change in transportation system provider hours. For example, the request distribution system distributes transportation requests to provider devices to improve network coverage and increase overall provider hours across the entire system. In some cases, the request distribution system increases transportation system provider hours by providing a transportation request to a limited-eligibility provider device that may be inconsistent with the provider devices current status. In some embodiments, the request distribution system increases transportation system provider hours by providing a transportation request to an online provider device that is expected to go offline. Indeed, the expected change in transportation system provider hours can be provider-device-specific, where the total provider hours across the request distribution system are increased as a result of increasing provider hours for a single provider device (e.g., to service one or more additional transportation requests).

As mentioned, the request distribution system can provide transportation requests to limited-eligibility provider devices based on expected changes in network coverage time. In certain embodiments, the request distribution system can identify one or more limited-eligibility provider devices associated with a transportation matching system. In particular, the request distribution system can identify, from among a plurality of provider devices associated with the transportation matching system, a subset of the provider devices that are not eligible to receive all types of transportation requests—or that are eligible to receive only certain types of transportation requests. For example, the request distribution system identifies limited-eligibility provider devices as provider devices that are not actively running a mobile application associated with the transportation matching system and/or that have a provider device status for receiving only certain request types. In one or more embodiments, the request distribution system provides transportation requests that are inconsistent with the current eligibility status of the limited-eligibility provider device to increase network coverage time.

As discussed, the request distribution system can also provide transportation requests to online provider devices, full-eligibility provider devices, or limited-eligibility provider devices consistent with their current eligibility status in order to improve network coverage time. For example, the request distribution system can predict an online provider device that is likely to go offline. In response the request distribution system can predict a change in network coverage time from providing a transportation request to the online provider device. Based on the change in network coverage time, the request distribution system can select a transportation request to provide to the online provider device.

In some embodiments, the request distribution system determines transportation request metrics associated with a received transportation request. For example, the request distribution system determines metrics based on predicting effects of providing the transportation request to one provider device versus another. In some cases, the request distribution system determines an expected change in network coverage time based on providing the transportation request to a limited-eligibility provider device and/or to an online provider device that is expected to go offline (e.g., within a certain timeframe or after a number of transportation requests). In some embodiments, the request distribution system also (or alternatively) determines a request reliability metric, an acceptance probability, and/or a cancelation probability associated with the transportation request.

In one or more embodiments, the request distribution system can determine different expected changes in network coverage time in relation to, or resulting from, different provider devices. To determine an expected change in network coverage time, in some implementations, the request distribution system can determine, for the transportation request, an expected change in limited-eligibility provider hours (e.g., network coverage time from limited-eligibility provider devices), an expected change in full-eligibility provider hours (e.g., network coverage time from full-eligibility provider hours), an expected change in online provider hours, and/or an expected change in matching future transportation requests in relation to a given provider device (e.g., limited-eligibility or otherwise).

In certain cases, the request distribution system compares, for a single transportation request, different arrival times for different provider devices as well. For instance, the request distribution system can determine a first arrival time for a first provider device (e.g., a limited-eligibility provider device) to arrive at a pick-up location for servicing the transportation request and can determine a second arrival time for a second provider device (e.g., a full-eligibility provider device or a different limited-eligibility provider device) to arrive at the pick-up location for servicing the transportation request. The request distribution system can further compare the first arrival time and the second arrival time.

Based on the comparison of the arrival times, the different expected changes in network coverage time, and/or the other transportation request metrics, the request distribution system can determine or select a provider device to provide the transportation request. For example, the request distribution system can select a limited-eligibility provider device or another provider device as a recipient for the transportation request based on determining that providing the transportation request to the provider device will result in an overall increase in network coverage time (e.g., for the transportation matching system as a whole and/or for a particular geographic region). In addition, the request distribution system can select the provider device based on comparing the arrival times and/or based on the request reliability metric, the acceptance probability, and/or the cancelation probability associated with the transportation request. In some cases, the request distribution system can select an initial provider device for a transportation request and can reassign the transportation request to a different provider device (e.g., a limited-eligibility provider device) based on the expected change in network coverage time, comparing arrival times, and/or other transportation metrics.

In one or more embodiments, the request distribution system provides a transportation request notification to a selected provider device. For example, after selecting a provider device to receive the transportation request, the request distribution system can provide a transportation request notification to the provider device. In some cases, a transportation request notification indicates a transportation request and provides a selectable option to modify a provider device status and/or accept the transportation request. In certain implementations, the transportation request notification is a limited-duration request notification selectable only for a limited period of time.

As suggested above, the disclosed request distribution system provides several improvements or advantages over conventional transportation network systems. For instance, the request distribution system can improve network coverage and more efficiently utilizes computing resources compared to prior systems. In some cases, the request distribution system improves network coverage by tapping into a previously unused computing resource (e.g., limited-eligibility provider devices) or avoiding lost computing resources (e.g., online provider devices going offline). Specifically, the request distribution system can provide transportation requests to limited-eligibility provider devices or online provider devices to improve overall network coverage based on various factors such as request reliability, arrival time, acceptance probabilities, cancelation probabilities, and expected changes to network coverage time (e.g., transportation system provider hours). By providing transportation requests in this manner, the request distribution system can activate or engage resources left inactive or lost in prior systems to ensure more complete network coverage. Moreover, by intelligently improving network coverage to balance imbalances between requester and provider computing devices, the system can avoid increased network bandwidth consumption and digital communications to more efficiently utilize computing resources.

Indeed, imbalances between requester devices and provider devices resulting from gaps in network coverage can lead to a variety of system inefficiencies. Conventional systems expend excessive amounts of computing resources (such as processing power, network bandwidth, and memory) in seeking to solve these device imbalances. For example, when there are an excessive number of requester devices relative to provider devices, conventional systems generate and transmit large numbers of digital communications in a reactive fashion to redistribute resources. Such digital computing tasks can include repeatedly executing matching algorithms, responding to excessive and repetitive queries from requester devices and provider devices, providing excessive digital navigation instructions, addressing increased cancellation (and re-matching) requests, and communicating with requester and provider devices for an increased length of time (device imbalances lead to longer wait times and a corresponding increase in bandwidth consumption). In short, poor network coverage and device imbalances leads to a relative increase in computer resource consumption per transaction request.

The request distribution system can more intelligently improve network coverage and reduces computing resources. Indeed, by providing transportation requests based on expected changes to network coverage time (and the particular need or value of additional network coverage time), the request distribution system can intelligently address device imbalances across the system to reduce computational inefficiencies. Indeed, in circumstances where requester devices spike, the request distribution system can provide digital transportation requests to provider devices, rebalance the disparity in computing devices, and reduce computational requirements. Specifically, the request distribution system can reduce queries from requester devices and provider devices, reduce the duration and quantity of navigational instructions transmitted to various devices, reduced cancellations (and re-matching) requests, and reduce bandwidth consumption per transportation request by reducing wait times for provider devices and requester devices. In short, the improvements to network coverage allow the request distribution system to expend fewer computational resources.

In addition, the request distribution system can achieve these efficiency improvements while intelligently and flexibly managing existing requester devices and provider devices operating within a transportation matching system. As mentioned above, the request distribution system can analyze various transportation metrics (such as reliability of particular transportation requests, expected acceptance probabilities, changes in network coverage time). The request distribution system can utilize these features to flexibly and intelligently provide transportation requests to provider devices in a manner that improves overall system efficiency, without increasing requester device wait times or reducing provider hours for other provider devices. In short, the request distribution system can improve efficiency across the transportation matching system, including existing requester devices and provider devices operating within the transportation matching system.

Further, some existing transportation network systems encourage provider devices to service transportation requests and/or to come online to be available for servicing transportation requests utilizing monetary incentives. To elaborate, existing systems sometimes provide one-time bonuses and/or add compensation multipliers to transportation requests to incentivize transportation providers to be available to service transportation requests. The request distribution system, by contrast, utilizes digital transportation requests to improve network coverage time. Thus, rather than requiring monetary incentives, the request distribution system utilizes digital notifications and transportation requests to improve system efficiency.

As indicated by the foregoing discussion, the present disclosure utilizes a variety of terms to describe features and advantages of the request distribution system. For example, as used herein, the term "provider device" refers to a computing device associated with a transportation provider or driver (e.g., a human driver or an autonomous computer system driver) who operates a transportation vehicle. For instance, a provider device refers to a mobile device such as a smartphone or tablet operated by a provider—or a device associated with an autonomous vehicle that drives along transportation routes.

Along these lines, a "limited-eligibility provider device" refers to a provider device that is eligible to accept a limited subset of transportation requests or no transportation requests at all. For example, a limited-eligibility provider device can include a provider device that is not actively running a mobile application associated with a transportation matching system (e.g., the application is not running as a foreground process). Not running the mobile application reflects a provider device status that indicates that the provider device is not currently accepting transportation requests (e.g., an offline status). As another example, a limited-eligibility provider device can include a provider device that is actively running a mobile application associated with a transportation matching system (e.g., the application is running as a foreground process) and with a provider device status that indicates that the provider device is not currently accepting transportation requests. As yet another example, a limited-eligibility provider device can include a provider device that is actively running a mobile application associated with a transportation matching system and with a provider device status that indicates the provider device is currently accepting only transportation requests of a specific request type (e.g., a destination mode status, a high value mode status, an airport queue status, or a delivery status).

Moreover, as mentioned above, in some embodiments the request distribution system can provide a transportation request to an online provider device (consistent with their current eligibility status) to further improve network coverage time. As used herein, "online" provider device refers to a provider device that is running a mobile application associated with a transportation matching system with a provider device status that indicates the provider device is currently accepting transportation requests.

Relatedly, the term "request type" refers to a type or a mode associated with a transportation request. In particular, a request type can refer to a mode of a transportation request compatible with a particular provider device status. For example, a request type can indicate a transportation request for a standard (e.g., classic) transportation type, a ride pool type, a wait-and-save type, a premium transportation type, a high value mode type, an airport queue type, or a delivery type. In some embodiments, a transportation matching system does not provide a transportation request of a particular request type (e.g., a destination mode request) to a provider device where the provider device status is incompatible with the request type. For instance, if the provider device status indicates that the provider device is in destination mode, and the request distribution system determines that a received transportation request is not compatible with the destination mode of the provider device (e.g., is not a high value type for a provider device in high value mode), then the request distribution system refrains from providing the transportation request to the provider device.

In addition, the term "provider device status" refers to a status or mode associated with a provider device that indicates which transportation requests the provider device is eligible to accept. For example, a provider device status indicates acceptance of all transportation requests, a subset of transportation requests, or no transportation requests. Example provider device statuses include an online status, an offline status, a normal mode status (e.g., for standard transportation requests), a destination mode status, a high value mode status, an airport queue status, or a delivery status. In some cases, a provider modifies a provider device status by changing from online to offline, from destination mode to normal mode, or some other status modification. In some cases, a provider device can include a provider device that is actively running a mobile application associated with a transportation matching system and that is expected to go offline—i.e., that has at least a threshold signoff probability.

A "signoff probability" indicates a likelihood of ending a current active session within a provider application. For instance, a signoff probability indicates a probability of terminating an active session within a particular period of time or after completing a particular number of transportation requests (or a current transportation request). In some cases, a signoff probability is based on one or more signoff probability factors such as a shift start time, provider device location, an idle time, a duration of a current active session, an average session duration for the specific provider profile and/or across multiple provider profiles within a geographic region associated with the provider device location, an average number of transportation requests serviced per active session for the specific provider profile and/or across multiple provider profiles within a geographic region associated with the provider device location, and/or an average provider compensation per active session for the specific provider profile and/or across multiple provider profiles within a geographic region associated with the provider device location. In some cases, the term "idle time" refers to a duration of time that a provider device is online, available, and not servicing a transportation request. For example, an idle time can include a time period (e.g., during an active session) since a provider device has received a transportation request and/or a duration of time since completing a previous transportation request (and without receiving a subsequent transportation request).

In contrast to a limited-eligibility provider device, the term "full-eligibility provider device" refers to a provider device that is eligible to accept additional (or all) types of transportation requests. For example, a full-eligibility provider device refers to a provider device with a provider device status indicating that the provider device is currently accepting additional request types relative to the limited-eligibility provider devices (e.g., a general online status with no special provider device status or more). In some cases, a full-eligibility provider device is actively running a mobile application associated with a transportation matching system.

As suggested above, the term "requester device" refers to a computing device associated with a requester who submits a transportation request to a transportation matching system. For instance, a requester device receives interaction from a requester in the form of user interaction to submit a transportation request. After the transportation matching system matches a requester (or a requester device) with a provider (or a provider device), the requester can await pickup by the provider at a predetermined pick-up location. Upon pick-up, the provider transports the requester to a drop-off location specified in the requester's transportation request. Accordingly, a requester may refer to (i) a person who requests a request or other form of transportation but who is still waiting for pickup or (ii) a person whom a transportation vehicle has picked up and who is currently riding within the transportation vehicle to a drop-off location.

As mentioned, in some embodiments, the request distribution system determines transportation request metrics associated with a transportation request. As used herein, the term "transportation request metric" refers to a metric or value associated with a transportation request that impacts selection of a transportation provider as a recipient for the transportation request. Indeed, the request distribution system determines transportation request metrics to select a particular provider device to match to the transportation request. Example transportation request metrics include a request reliability metric, an acceptance probability, a cancelation probability (e.g., as part of a request reliability metric), an arrival time, a compatibility in relation to a provider device, and/or an expected change in network coverage time associated with the transportation request. Some transportation request metrics are specific to a transportation request itself, while other transportation request metrics vary from provider device to provider device (e.g., for the same transportation request).

Along these lines, the term "network coverage time" refers to a measure of time that a provider device provides is available for transportation services as part of a transportation matching system and/or for a particular geographic region. In particular, network coverage time can refer to transportation system provider hours (or simply "provider hours") that indicate a measure of time that a provider device is available to accept and service transportation requests. Relatedly, a "full-eligibility provider hour" refers to a transportation system provider hour (or network coverage time) associated with, or provided by, a full-eligibility provider device. Conversely, a "limited-eligibility provider hour" refers to a transportation system provider hour (or network coverage time) associated with, or provided by, a limited-eligibility provider device.

Additionally, the term "request reliability metric" refers to a transportation request metric representing or reflecting a measure of reliability or certainty that a transportation request will be available upon acceptance by a provider device. For example, a request reliability metric can include a likelihood or a probability that a transportation request will still remain within the system, available for acceptance, by the time a provider associated with a provider device selects an option to accept the transportation request. In some cases, a request reliability metric indicates a likelihood that a transportation request will remain within the system (e.g., without cancelation or removal by a requester via a requester device) for at least a threshold period of time.

In one or more implementations, a request reliability metric is based on one or more constituent factors, which are described in further detail below with reference to the figures. One example factor that affects a request reliability metric for a transportation request is a number of threshold intent sessions that take place within a geographic region associated with the transportation request. As used herein, the term "threshold intent session" refers to an application session that satisfies a threshold level of intent for submitting a transportation request. For example, a threshold intent session refers to an instance of using an application associated with a transportation matching system, where the request distribution system determines that the instance or session has at least a threshold probability of resulting in a transportation requests (e.g., that the requester will actually submit a transportation request during the session).

To determine transportation request metrics, in some cases, the request distribution system utilizes one or more machine learning models. As used herein, the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of decision trees, support vector machines, Bayesian networks, linear regressions, logistic regressions, random forest models, or neural networks.

As an example machine learning model, the request distribution system utilizes a "reliability metric machine learning model" (or "reliability metric model") to generate a predicted or expected request reliability metric for a transportation request. For example, the request distribution system utilizes the reliability metric machine learning model to generate the request reliability metric by analyzing and processing data such a number of threshold intent sessions, a number of provider devices waiting for requests, and a time since receiving the transportation request, among others. Additionally, the request distribution system utilizes other machine learning models to determine different transportation request metrics, including an acceptance probability machine learning model, a cancelation probability machine learning model, and/or a provider hour machine learning model.

Additional detail regarding the request distribution system will now be provided with reference to the figures. In particular, FIG. 1 illustrates a block diagram of a system environment for implementing a request distribution system 104 in accordance with one or more embodiments. As shown in FIG. 1, the environment includes server(s) 106 housing the request distribution system 104 as part of a transportation matching system 102. The environment of FIG. 1 further includes provider devices 108*a*-108*n* (including a provider application 110) and a requester device 112 (including a requester application 114), as well as a network 116. The server(s) 106 can include one or more computing devices to implement the request distribution system 104. Additional description regarding the illustrated computing devices (e.g., the server(s) 106, the provider devices 108*a*-108*n*, and/or the requester device 112) is provided with respect to FIGS. 11-12 below.

As shown, the request distribution system 104 utilizes the network 116 to communicate with the provider devices 108*a*-108*n* and the requester device 112. The network 116 may comprise any network described in relation to FIGS. 11-12. For example, the request distribution system 104 communicates with the provider devices 108*a*-108*n* and the requester device 112 to match transportation requests received from the requester device 112 with one or more of the provider devices 108*a*-108*n*. Indeed, the transportation matching system 102 or the request distribution system 104 can receive a transportation request from the requester device 112 and can provide request information to the provider devices 108*a*-108*n*, such as a requested location (e.g., a requested pickup location and/or a requested drop-off location), a requester identification (for a requester corresponding to the requester device 112), and a requested pickup time. In some embodiments, per device settings, the transportation matching system 102 or the request distribution system 104 receives device information from the provider devices 108*a*-108*n* and the requester device 112, such as location coordinates (e.g., latitude, longitude, and/or elevation), orientations or directions, motion information, and indications of user interactions with various interface elements.

To facilitate connecting requests with transportation vehicles, in some embodiments, the transportation matching system 102 or the request distribution system 104 communicates with the provider devices 108*a*-108*n* (e.g., through a provider application 110). As indicated by FIG. 1, the provider devices 108*a*-108*n* include the provider application 110. In many embodiments, the transportation matching system 102 or the request distribution system 104 communicates with the provider devices 108*a*-108*n* through the provider application 110 to, for example, receive and provide information including location data, motion data, transportation request information (e.g., pickup locations and/or drop-off locations), and transportation route information for navigating to one or more designated locations.

Similarly, the transportation matching system 102 or the request distribution system 104 communicates with the requester device 112 (e.g., through the requester application 114) to facilitate connecting requests with transportation vehicles. In many embodiments, the request distribution system 104 communicates with the requester device 112 through the requester application 114 to, for example, receive and provide information including location data, motion data, transportation request information (e.g., requested locations), and navigation information to guide a requester to a designated location.

In some embodiments, the provider devices 108a-108n can include devices with different provider device statuses and/or that may or may not be actively running the provider application 110. The transportation matching system 102 thus selects one or more of the provider devices 108a-108n to receive a transportation request based on the different provider device statuses and/or an indication of whether a particular provider device is actively running the provider application 110. For example, the transportation matching system 102 provides a transportation request to a provider device 108a that is online and in destination mode. As another example, the transportation matching system 102 provides a transportation request to a provider device 108n that is offline but that is actively running the provider application 110 (e.g., as a foreground process).

As indicated above, the transportation matching system 102 or the request distribution system 104 can provide (and/or cause the provider devices 108a-108n to display or render) visual elements within a graphical user interface associated with the provider application 110 and the requester application 114. For example, the transportation matching system 102 or the request distribution system 104 can provide a digital map for display on the provider devices 108a-108n and that illustrates a transportation route to navigate to a designated location at an intersection. The request distribution system 104 can also provide a transportation request notification for display on one or more of the provider devices 108a-108n indicating a transportation request and including a selectable option to modify a provider device status and/or accept the transportation request (e.g., "go online and accept").

In addition, the request distribution system 104 can provide a digital map for display on the requester device 112, where the digital map illustrates an initial transportation route (for a provider to navigate to the requested location) and a modified transportation route (for a provider to navigate to the designated location). The request distribution system 104 selects one or more of the provider devices 108a-108n as a recipient for a transportation request received from the requester device 112 based on various factors. Such factors may include a provider device status, an indication of whether a provider device is actively running the provider application 110 (or running limited functionality of the provider application 110 as a background process or not running the provider application 110 at all), transportation request metrics, and or other factors such as a requested location indicating a street intersection, candidate designated locations at the intersection, a provider-device location, locations of other provider devices, provider incentives, requester incentives, a time of day, traffic information, and/or other transportation matching considerations.

Although FIG. 1 illustrates the environment having a particular number and arrangement of components associated with the request distribution system 104, in some embodiments, the environment may include more or fewer components with varying configurations. For example, in some embodiments, the transportation matching system 102 or the request distribution system 104 can communicate directly with the provider devices 108a-108n and/or the requester device 112, bypassing the network 116. In these or other embodiments, the transportation matching system 102 or the request distribution system 104 can be housed (entirely on in part) on the provider devices 108a-108n and/or the requester device 112. Additionally, the transportation matching system 102 or the request distribution system 104 can include or communicate with a database for storing information, such as various machine learning models, transportation request metrics, transportation requests, and/or other information described herein.

Figure 2:
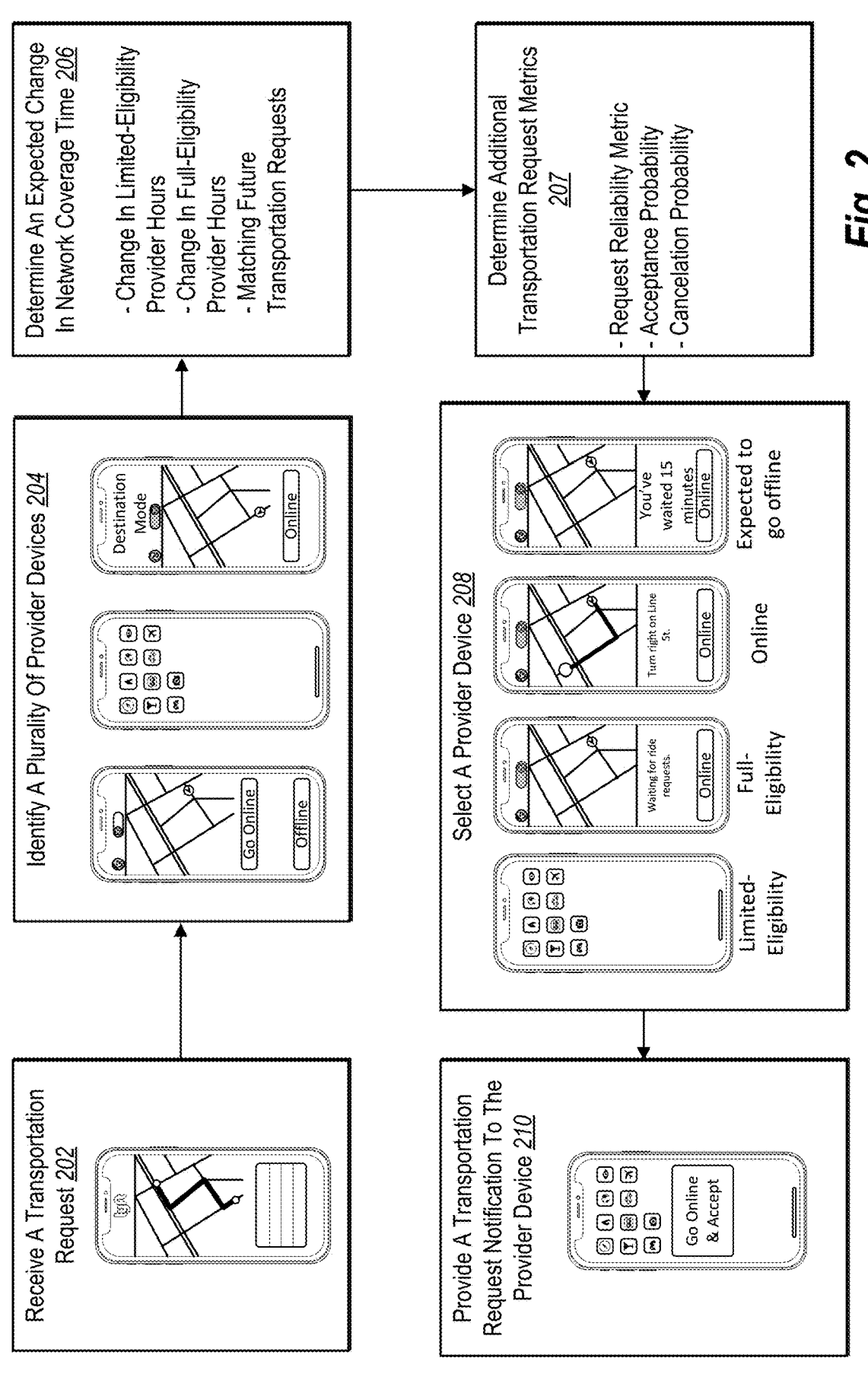
FIG. 2 illustrates an example sequence flow for selecting and providing a transportation request to a provider device in accordance with one or more embodiments.

As mentioned, in certain embodiments, the request distribution system 104 can provide a transportation request to a provider device based on an expected change in network coverage time. In particular, the request distribution system 104 can select a provider device as a recipient for a transportation request based on factors such as a provider device status and transportation request metrics such as an expected change in network coverage time. FIG. 2 illustrates an example sequence of acts the request distribution system 104 performs to select a provider device and provide transportation request notification to the provider device in accordance with one or more embodiments. In some embodiments, the request distribution system 104 performs the acts of FIG. 2 only upon determining that a particular geographic region associated with a transportation request (and/or the limited-eligibility provider device) is experiencing poor network coverage (e.g., with fewer than a threshold number of provider devices per request and/or wait times exceeding a threshold wait time).

As illustrated in FIG. 2, the request distribution system 104 performs an act 202 to receive a transportation request. In particular, the request distribution system 104 receives a transportation request from the requester device 112 indicating a requested pick-up location and a requested drop-off location. For example, the request distribution system 104 receives a transportation request to surface to a provider device (e.g., one of the provider devices 108a-108n) to service the transportation request.

As further illustrated in FIG. 2, the request distribution system 104 performs an act 204 to identify a plurality of provider devices. More specifically, the request distribution system 104 identifies a plurality of provider devices such as limited-eligibility provider devices that are compatible with accepting less than all transportation requests. The request distribution system 104 can also identify full-eligibility provider devices and/or a variety of online provider devices. For example, the request distribution system 104 identifies a limited-eligibility provider device with a provider device status indicating that the provider device is offline, or not currently accepting transportation requests, within the transportation matching system 102. The request distribution system 104 can further determine that the provider device is actively running the provider application 110 (even in the offline state) or that the provider device is not actively running the provider application 110 but is instead running the provider application as a background process (e.g., with a limited set of function compared to the full application functionality of running as a foreground process) or while actively running a different application simultaneously.

As another example, the request distribution system 104 can determine a limited-eligibility provider device as a provider device that is actively running the provider application 110 and that has a provider device status indicating receipt of only certain request types. For instance, the request distribution system 104 determines that the provider device status is a destination mode status where the provider device only accepts transportation requests that in along a particular route that the provider device is traveling (e.g., that will enable the provider device to service the transportation request and still arrive at a desired destination at an indicated time). In some cases, the request distribution system 104 determines that the provider device status is a high value mode status where the provider device only accepts transportation requests that will result in at least a threshold provider compensation for servicing the requests. In other cases, the request distribution system 104 determines that the provider device status is an airport queue status where the provider device only accepts transportation requests indicating transportation from (or to) an airport (or even a particular terminal at an airport). In still other cases, the request distribution system 104 determines that the provider device status is a delivery status where the provider device only accepts transportation requests that indicate delivery of goods from a pick-up location to a drop-off location.

As shown in FIG. 2, the leftmost provider device within the act 204 is a limited-eligibility provider device that is actively running the provider application 110 but in an offline mode for not accepting transportation requests. The middle provider device is a limited-eligibility provider device that is not actively running the provider application 110 (e.g., displaying a home screen of a mobile device) and that has a provider device status indicating that the provider device is not currently accepting transportation requests. The rightmost provider device is a limited-eligibility provider device that is actively running the provider application 110 and that has a provider device status indicating acceptance of only certain request types (e.g., a destination mode status indicating acceptance of only transportation requests compatible with the destination of the device). In some embodiments, the request distribution system 104 determines other types of limited-eligibility provider devices, such as provider devices with provider settings (e.g., indicating requester rating preferences, destination preferences, compensation preferences, and/or other preferences).

As further illustrated in FIG. 2, the request distribution system 104 performs an act 206 to determine an expected change in network coverage time. In particular, the request distribution system 104 determines an expected change in network coverage time associated with the transportation request. For example, to determine an expected change in network coverage time, the request distribution system 104 determines an expected change in transportation system provider hours that would result from providing the transportation request to a particular provider device. In some cases, the request distribution system 104 determines different expected changes in transportation system provider hours for different provider devices and compares the expected changes. As part of determining an expected change in transportation system provider hours (or network coverage time), in some cases, the request distribution system 104 determines an expected change in limited-eligibility provider hours and an expected change in full-eligibility provider hours. Additional detail regarding determining transportation request metrics is provided below with reference to subsequent figures.

As illustrated in FIG. 2, the request distribution system 104 further performs an act 207 to determine additional transportation request metrics. To elaborate, the request distribution system 104 determines transportation request metrics associated with the transportation request received via the act 202. In one or more embodiments, the request distribution system 104 determines a request reliability metric that indicates a likelihood that the transportation request will remain available until a provider device (e.g., one of the limited-eligibility provider devices) accepts the transportation request. In the same or other embodiments, the request distribution system 104 determines an acceptance probability indicating a probability that a provider device (e.g., one of the limited-eligibility provider devices) accepts the transportation request. In these or other embodiments, the request distribution system 104 determines a cancelation probability indicating a probability that the requester (associated with the requester device 112) will cancel the transportation request (either before acceptance or after acceptance by a provider device).

As shown in FIG. 2, the request distribution system 104 further performs an act 208 to select a provider device. In particular, the request distribution system 104 selects a provider device from among those identified via the act 204. To determine which provider device to select, the request distribution system 104 considers and compares the transportation request metrics determined via the act 206. In one or more embodiments, the request distribution system 104 selects a provider device by determining which provider device results in an increase (e.g., the greatest increase) in network coverage time (e.g., transportation system provider hours for the system as a whole or for a particular geographic region). In certain cases, the request distribution system 104 selects a provider device based further (or alternatively) on the request reliability metric, the acceptance probability, and/or the cancelation probability. For example, the request distribution system 104 can utilize an objective function to analyze various transportation metrics and optimize (or improve) an overall system efficiency metric.

In one or more embodiments, the request distribution system 104 selects a provider device based on other factors as well. For example, the request distribution system 104 determines and compares arrival times associated with different provider devices, including limited-eligibility provider devices and full-eligibility provider devices. Specifically, the request distribution system 104 determines and compares arrival times for provider devices to arrive at a pick-up location associated with the transportation request. As shown, the request distribution system 104 selects a provider device based on comparing one or more of the aforementioned transportation request metrics or other factors associated with limited-eligibility provider devices, full-eligibility provider devices, online provider devices (e.g., either limited-eligibility or full-eligibility), and provider devices expected to go offline (e.g., with at least a threshold signoff probability).

In some embodiments, the request distribution system 104 determines an activity probability indicating a likelihood that a selected provider device will remain active (e.g., online for accepting at least one additional request during a single online provider session) based on accepting the received transportation request. For example, the request distribution system 104 determines an activity probability based on activity factors such as a provider compensation for servicing the request, a distance to a pick-up location for the request, and/or a duration of time required to service the request.

In some cases, the request distribution system 104 further determines, as part of the activity probability determination, a likelihood of receiving another transportation request in the travel direction of the provider device and/or within a particular geographic region associated with the provider device (e.g., a region where the limited-eligibility provider device is located after servicing the transportation request). If the request distribution system 104 determines that the activity probability satisfies a threshold based on one or more of these factors, then the request distribution system 104 provides the transportation request to the selected provider device. On the other hand, if the request distribution system 104 determines that the activity probability fails to satisfy the threshold, then the request distribution system 104 identifies or determines a different transportation request to provide to the selected provider device.

As further illustrated in FIG. 2, the request distribution system 104 performs an act 210 to provide a transportation request notification to a selected provider device. More particularly, the request distribution system 104 provides a notification to the provider device indicating the transportation request and including a selectable option to modify a provider device status of the provider device. In some cases, the request distribution system 104 provides a limited-duration transportation request notification, allowing a certain amount of time to elapse before revoking the transportation request to prevent overly long wait times for the requester. In some embodiments, the transportation request notification includes a selectable option to modify the provider device status to a status compatible with the transportation request (e.g., from offline to online or from destination mode to normal mode). In these or other embodiments, the selectable option within the transportation request notification is selectable to both modify the provider device status and to accept the transportation request (e.g., with a single interaction). Additional detail regarding the transportation request notification is provided below with reference to subsequent figures.

In certain embodiments, the request distribution system 104 performs the acts 202-210 for one or more geographic regions or for the transportation matching system 102 as a whole. For example, the request distribution system 104 performs the acts 202-210 for a particular geographic region based on determining that the geographic region is currently experiencing poor network coverage with fewer than a threshold number of transportation provider devices per received transportation request and/or with wait times for pick-up that exceed a threshold wait time. The request distribution system 104 thus selects a provider device to improve network coverage via the acts 202-210.

In some implementations, the request distribution system 104 determines that there are no full-eligibility provider devices within a geographic area to service a received transportation request, and the request distribution system 104 therefore provides the transportation request to a limited-eligibility provider device within the region. In other implementations, the request distribution system determines that there are full-eligibility provider devices within the region but that selecting a limited-eligibility provider device will nevertheless result in increased network coverage time (e.g., transportation system provider hours), often benefiting both the full-eligibility provider device (e.g., by freeing up the device to service other requests) and the limited-eligibility provider device (e.g., by providing a transportation request that would otherwise be assigned elsewhere).

Figure 3:
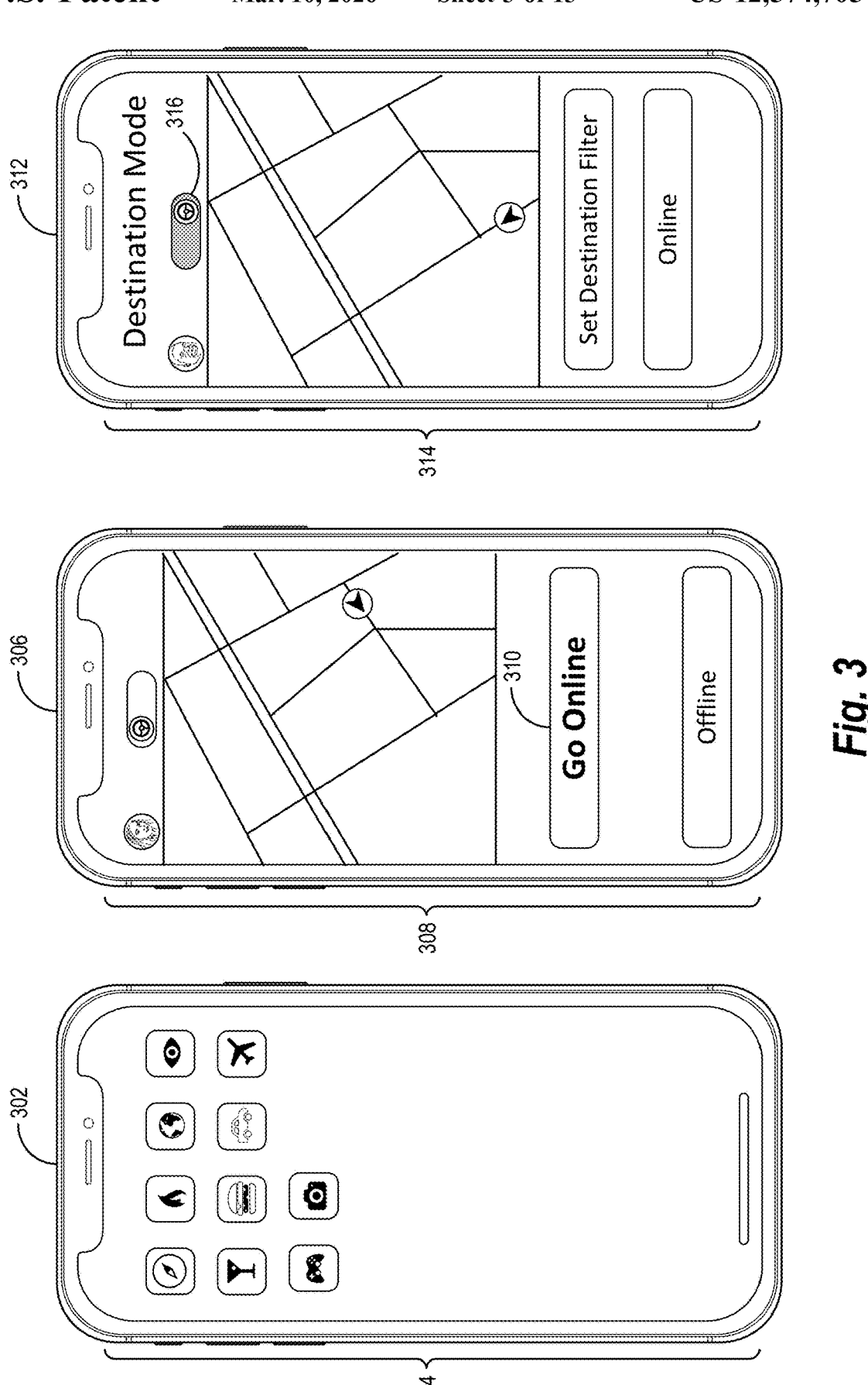
FIG. 3 illustrates example limited-eligibility provider devices in accordance with one or more embodiments.

As mentioned above, in certain described embodiments, the request distribution system 104 identifies one or more limited-eligibility provider devices as candidates for servicing a transportation request. In particular, the request distribution system 104 identifies limited-eligibility provider devices that are not currently accepting all transportation requests in a normal mode but that instead have restrictions on which request types (if any) they will accept at the time. FIG. 3 illustrates example limited-eligibility provider devices in accordance with one or more embodiments.

As illustrated in FIG. 3, the request distribution system 104 identifies a limited-eligibility provider device 302 that is not actively running the provider application 110. In some implementations, the request distribution system 104 determines that the limited-eligibility provider device 302 is running limited functionality of the provider application 110 as a background application or a background process. In addition, to be eligible for less than all transportation requests, the request distribution system 104 determines that the limited-eligibility provider device 302 has a provider device status indicating that the limited-eligibility provider device 302 is limited in its acceptance of transportation requests. For example, the request distribution system 104 determines that the provider device status indicates that the limited-eligibility provider device 302 is not currently accepting transportation requests (e.g., an offline status). In some cases, the limited-eligibility provider device 302 cannot modify its provider device status when not actively running the provider application 110.

As shown, the request distribution system 104 determines that the limited-eligibility provider device 302 is displaying an interface not associated with the provider application 110. As illustrated, the limited-eligibility provider device 302 is displaying home screen interface 304 and not a provider interface associated with the provider application 110. In some embodiments, the limited-eligibility provider device 302 can instead display a user interface associated with a different application (e.g., an application associated with a different transportation service system) while running the provider application 110 in the background. In any event, to surface a transportation request to the limited-eligibility provider device 302, the request distribution system 104 can determine that the limited-eligibility provider device 302 is running the provider application 110 at least as a background process for receiving transportation request notifications. In some implementations the limited-eligibility provider device 302 is not running the provider application 110 in any form and can provide a transportation request notification through another application (e.g., a text message or email).

As further illustrated in FIG. 3, the request distribution system 104 identifies a limited-eligibility provider device 306 that is actively running the provider application 110. Indeed, the limited-eligibility provider device 306 is displaying a provider interface 308 associated with the provider application 110, including a map portion and various selectable elements. In addition, the request distribution system 104 determines that the limited-eligibility provider device 306 is limited in its eligibility to accept transportation requests based on its provider device status. Specifically, the request distribution system 104 determines that the provider device status of the limited-eligibility provider device 306 indicates that the limited-eligibility provider device 306 will accept either no transportation requests (e.g., an offline status) or only certain request types. As shown, the limited-eligibility provider device 306 is in an offline mode. In some cases, the limited-eligibility provider device 306 further displays a selectable element 310 to modify a provider device status (e.g., "Go Online") when the limited-eligibility provider device 306 is in a limited eligibility mode of one type or another.

As further illustrated in FIG. 3, the request distribution system 104 identifies a limited-eligibility provider device 312 that is actively running the provider application but in a limited eligibility mode. To elaborate, the request distribution system 104 determines that the limited-eligibility provider device 312 has a provider device status indicating acceptance of only certain request types. As shown, the limited-eligibility provider device 312 is displaying the provider interface 314 in a destination mode, as indicated by the destination mode element 316. Thus, the request distribution system 104 determines that, because the limited-eligibility provider device 312 is in destination mode, the limited-eligibility provider device 312 only accepts transportation requests of a destination mode type—i.e., transportation requests that are compatible with the destination mode of the limited-eligibility provider device 312 such that the limited-eligibility provider device 312 can service the requests while still arriving to an indicated destination by an indicated time. Indeed, the limited-eligibility provider device 312 can set a destination filter (e.g., via the "Set Destination Filter" option) to indicate a destination location and an arrival time for the destination mode.

While FIG. 3 illustrates three example limited-eligibility provider devices, in some embodiments, the request distribution system 104 determines or identifies other limited-eligibility provider devices as well. In particular, the request distribution system 104 identifies a limited-eligibility provider device that has a different provider device status than online, offline, or destination mode. For example, the request distribution system 104 identifies a limited-eligibility provider device that has a provider device status indicating that the limited-eligibility provider device is in high value mode, in an airport queue, or in delivery mode. In some cases, the request distribution system 104 identifies a limited-eligibility provider device based on provider preferences indicating acceptance exclusively of transportation requests that satisfy the provider preferences, such as a minimum requester rating, a selected geographic region for pick-up and/or drop-off, a minimum provider compensation, a threshold duration for servicing the request, and/or other provider preferences.

In some embodiments, the request distribution system 104 determines a signoff probability (e.g., a probability that a provider device will terminate an active provider session). For example, the request distribution system 104 determines a probability of a provider device terminating an active provider session within a particular period of time (e.g., the next 5 minutes, the next 10 minutes, or the next 30 minutes) and/or after completing a particular number of transportation requests (e.g., after completing a current transportation request or a next transportation request). The request distribution system 104 can determine a signoff probability based on signoff probability factors such as provider device location, a duration of a current active session, a duration of time (e.g., during an active session) since a provider device has received a transportation request, an average session duration for the specific provider profile and/or across multiple provider profiles within a geographic region associated with the provider device location, an average number of transportation requests serviced per active session for the specific provider profile and/or across multiple provider profiles within a geographic region associated with the provider device location, and/or an average provider compensation per active session for the specific provider profile and/or across multiple provider profiles within a geographic region associated with the provider device location. In some cases, the request distribution system 104 utilizes a signoff prediction machine learning model to predict a signoff probability based on one or more of the aforementioned signoff probability factors.

Figure 4:
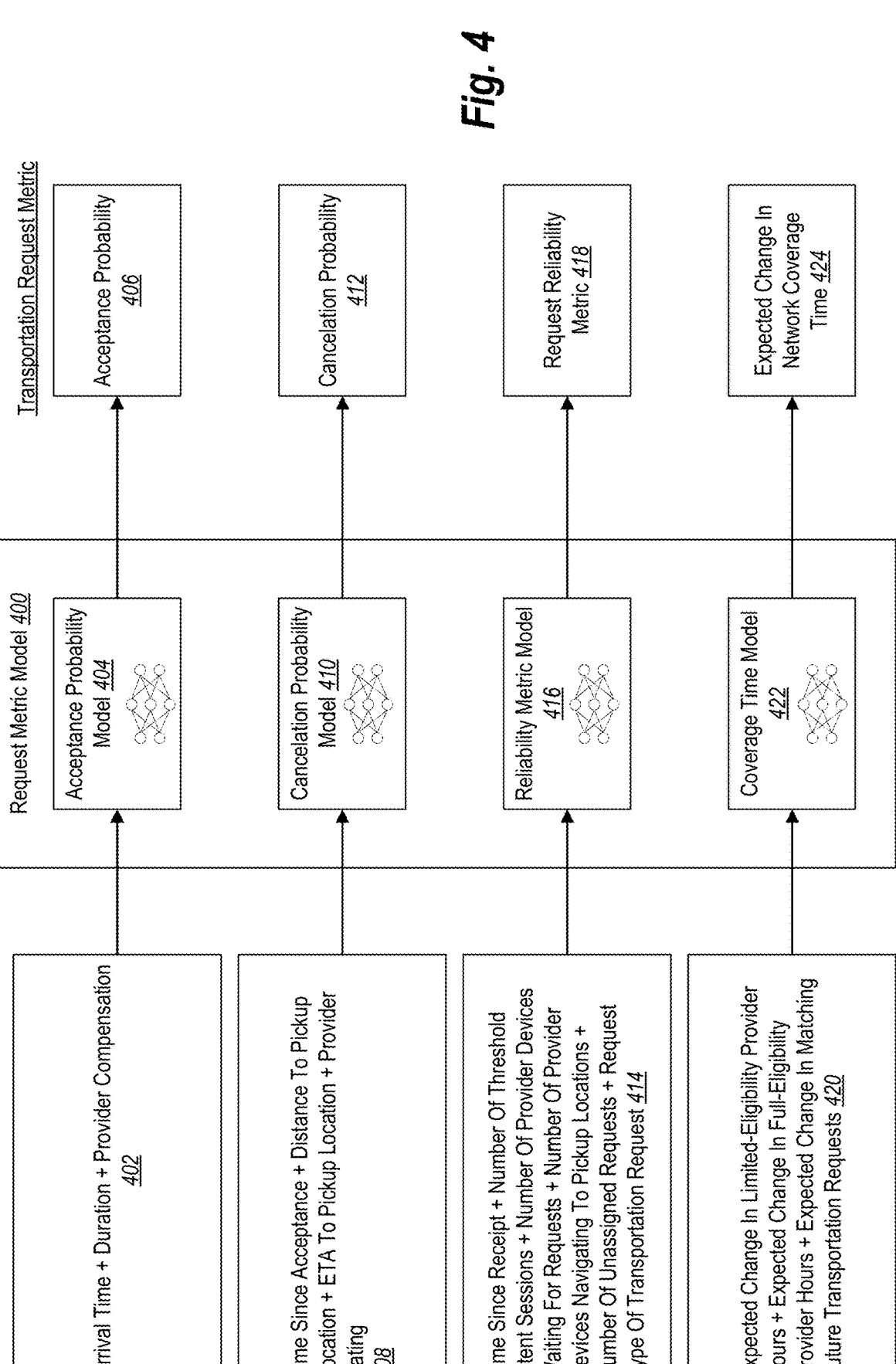
FIG. 4 illustrates an example flow for determining transportation request metrics in accordance with one or more embodiments.

As mentioned above, in certain described embodiments, the request distribution system 104 determines transportation request metrics associated with a received transportation request. In particular, the request distribution system 104 can determine transportation request metrics that contribute to the determination of if and/or when to provide a transportation request to a y provider device. In some cases, the request distribution system 104 utilizes one or more machine learning models to determine or generate transportation request metrics. FIG. 4 illustrates determining request metrics in accordance with one or more embodiments.

As illustrated in FIG. 4, the request distribution system 104 determines transportation request metrics including an acceptance probability, a cancelation probability, a request reliability metric, and an expected change in network coverage time (e.g., an expected change in transportation system provider hours). In some embodiments, the request distribution system 104 utilizes a single machine learning model, such as the request metric model 400, to generate one or more of the transportation request metrics. For example, the request distribution system 104 can utilize a request metric model to generate transportation request metrics based on various factors specific to each transportation request metric. In certain cases, the request metric model 400 further includes constituent machine learning models for generating each individual transportation request metric. Additionally, the request distribution system 104 can determine other transportation request metrics as well, such as an arrival time for a provider device to arrive at a pick-up location to service a transportation request and/or a compatibility of a transportation request with a provider device status of a provider device.

To determine an acceptance probability 406 for a transportation request, for example, the request distribution system 104 utilizes an acceptance probability model 404. In particular, the request distribution system 104 utilizes the acceptance probability model 404 to determine the acceptance probability 406 based on acceptance probability factors 402. In some cases, the acceptance probability factors 402 include an arrival time for a provider device to arrive at a pick-up location to service the transportation request. The acceptance probability factors 402 also include a duration for the provider device to service the transportation request (e.g., pick-up to drop-off or from acceptance to drop-off). Further, the acceptance probability factors 402 include a provider compensation (e.g., an overall compensation or a compensation per unit time) associated with the provider device servicing the transportation request. In some cases, the request distribution system 104 determines an acceptance probability based further (or alternatively) on other factors such as a requester rating, a pick-up location, a drop-off location, and/or a requester device location.

Indeed, the request distribution system 104 determines each of the acceptance probability factors 402 for a received transportation request. In some cases, the request distribution system 104 further determines each of the acceptance probability factors 402 for each of a number of candidate provider devices. For instance, the request distribution system 104 determines provider-device-specific arrival times, durations, and provider compensations associated with servicing the transportation request to determine providerdevice-specific acceptance probabilities. Indeed, each of the acceptance probability factors 402 vary across different provider devices (e.g., limited-eligibility provider devices), depending on location relative to the requested pick-up location. In addition, the request distribution system 104 utilizes the acceptance probability model 404 to generate or predict the acceptance probability 406 for a specific provider device accepting the transportation request based on the relevant factors. In certain cases, the request distribution system 104 further compares acceptance probabilities across different provider devices (e.g., limited-eligibility provider devices) to determine which provider devices are more likely to accept the transportation request.

In some embodiments, the request distribution system 104 determines an overall acceptance probability for the transportation request based on a combination of the individual acceptance probabilities. More specifically, the request distribution system 104 determines a combination (e.g., a weighted combination or an average) of provider-device-specific acceptance probabilities for the transportation request (across only limited-eligibility provider devices and/ or across limited-eligibility provider devices and full-eligibility provider devices). Thus, the request distribution system 104 determines an overall acceptance probability indicating how likely the transportation request is to be accepted by one provider device (e.g., limited-eligibility provider device) or another.

As further illustrated in FIG. 4, the request distribution system 104 determines a cancelation probability 412 for a transportation request. In particular, the request distribution system 104 determines the cancelation probability 412 from one or more cancelation probability factors 408, where the cancelation probability 412 indicates a likelihood of receiving a cancelation from the requester device 112 before pick-up. For example, the request distribution system 104 utilizes a cancelation probability model 410 to determine or predict the cancelation probability 412 based on the cancelation probability factors 408. The cancelation probability factors 408 can include a time since acceptance of the transportation request (e.g., a duration of time that has elapsed since the provider device accepted the transportation request), a distance of the provider device to the pick-up location, an arrival time for the provider device to arrive at the pick-up location, and/or a provider rating within the transportation matching system 102. In some cases, the cancelation probability factors 408 can also include a number of cancelations over a particular time period (e.g., a previous 3 days or a previous 5 days) and/or within a geographic region associated with the transportation request (e.g., a particular geofenced zone or geohash). Based on one or more of the aforementioned cancelation probability factors 408, the request distribution system 104 can determine a likelihood of receiving a cancelation of the transportation request from the requester device 112 (e.g., utilizing the cancelation probability model 410).

Additionally, the request distribution system 104 determines a request reliability metric 418 associated with a transportation request. Indeed, the request distribution system 104 determines a request reliability metric 418 that indicates a likelihood that the transportation request will remain available until a provider device accepts the request (e.g., the requester will wait without canceling and the request will not be provided to a different provider device). In particular, the request distribution system 104 utilizes a reliability metric model 416 to determine the request reliability metric 418 from one or more request reliability factors 414. The request reliability factors can include one or more of: i) a time that has elapsed since receiving the transportation request from the requester device 112, ii) a number of threshold intent sessions within a geographic region associated with the transportation request (e.g., a geofenced area or a geohash where the requester device 112 is located and/or where the pick-up location is located), iii) a number of provider devices (e.g., limited-eligibility provider devices and/or full-eligibility provider devices) waiting to receive transportation requests within the geographic region associated with the transportation request, iv) a number of provider devices (e.g., limited-eligibility provider devices and/or full-eligibility provider devices) within the geographic region associated with the transportation request navigating to pick-up locations to service transportation requests, v) a number of unassigned transportation requests (e.g., a transportation request not yet surfaced to a provider device) within the geographic region associated with the transportation request, and/or vi) a request type of the transportation request. As mentioned above, a threshold intent session refers to a session within a requester application 114 that satisfies a threshold probability of resulting in receiving a transportation request.

In some cases, the request distribution system 104 determines other request reliability factors in addition (or in the alternative) to those illustrated in FIG. 4. For example, the request distribution system 104 determines a number of limited-eligibility provider devices within a geographic region associated with the transportation request, including a number of offline provider devices and/or a number of limited-eligibility provider devices with provider devices statuses indicating acceptance of particular request types. As another example, the request distribution system 104 determines, as part of the request reliability metric, a number of provider devices (e.g., limited-eligibility provider devices and/or full-eligibility provider devices) currently transporting requesters from a pick-up location to a drop-off location.

As further illustrated in FIG. 4, the request distribution system 104 determines an expected change in network coverage time 424 (e.g., an expected change in transportation system provider hours). In particular, the request distribution system 104 utilizes a coverage time model 422 to determine or predict the expected change in network coverage time 424 from one or more provider hour factors 420. The provider hour factors can include: i) an expected change in limited-eligibility provider hours, ii) an expected change in full-eligibility provider hours, and/or iii) an expected change in matching future transportation requests (e.g., matching future transportation requests to the limited-eligibility provider device). Similarly, in analyzing an online provider device, the provider hour factors can include an expected change in provider online provider hours for a first provider and an expected changing in provider hours for one or more other providers. Indeed, the request distribution system 104 can determine or predict each of the provider hour factors 420 for different provider devices (e.g., limited-eligibility provider devices, online provider devices, and/or full-eligibility provider devices), where each provider device results in a different prediction for how providing the transportation request to the provider device will impact transportation system provider hours with respect to limited-eligibility provider hours, online provider hours, full-eligibility provider hours, and/or matching future requests to the provider device.

In determining the expected change in network coverage time 424, the request distribution system 104 determines an expected increase in transportation system provider hours across the transportation matching system 102 as a whole and/or over a particular geographic region (e.g., the geographic region associated with the transportation request). In some cases, the request distribution system 104 determines an expected increase/decrease in limited-eligibility provider hours, an expected increase/decrease in online provider hours, and/or an expected increase/decrease in full-eligibility provider hours. Further, the request distribution system 104 can compare these expected changes to determine an overall increase in transportation system provider hours. In certain embodiments, the request distribution system 104 determines that providing a transportation request to a limited-eligibility provider device (or another provider device) will result in at least a threshold increase in transportation system provider hours (balancing any changes in limited-eligibility and full-eligibility provider hours) before providing the transportation request to the limited-eligibility provider device (or another provider device).

As a further component of determining the expected change in network coverage time 424, the request distribution system 104 generates a prediction for the expected change in matching future transportation requests. In particular, the request distribution system 104 determines how likely it is that, if a transportation request were provided to a provider device, the provider device would remain online to service one or more additional transportation requests. Indeed, the request distribution system 104 can determine an expected change that reflects a number of future transportation requests expected to be matched to the limited-eligibility provider device within an online provider session after servicing an initial transportation request.

In one or more implementations, the request distribution system 104 considers or combines multiple transportation request metrics together in determining whether to provide a transportation request to a limited-eligibility provider device and/or in selecting which limited-eligibility provider device. For example, the request distribution system 104 determines an acceptance probability, a cancelation probability, a request reliability metric, and/or an expected change in network coverage time (e.g., transportation system provider hours) associated with providing a transportation request to a first provider device (e.g., limited-eligibility, online, and/or full-eligibility). In addition, the request distribution system 104 determines an acceptance probability, a cancelation probability, a request reliability metric, and/or an expected change in network coverage time (e.g., transportation system provider hours) associated with providing the transportation request to a second provider device (e.g., limited-eligibility, online, and/or full-eligibility). The request distribution system 104 further compares the different transportation request metrics to determine whether to provide the transportation request to a limited-eligibility provider device or to an online provider device/full-eligibility provider device. In some cases, the request distribution system 104 further selects which limited-eligibility provider device (or other provider device) to surface the transportation request to based on the transportation request metrics.

In certain embodiments, the request distribution system 104 balances the consideration of the transportation request metrics according to a particular objective function. More specifically, the request distribution system 104 utilizes an objective function as a basis for distributing transportation requests to accomplish the objective of increasing (e.g., maximizing) an expected value of a transportation request according to the transportation request metrics. For example, the request distribution system 104 utilizes an objective function given by:

$$\text{Maximize Expected Value} = (\text{Expected network coverage time})/(\text{value per provider hour}) * P(\text{acceptance}) - P(\text{cancelation}) * \text{request value} - \text{negative retention impact}$$

where Expected network coverage time represents an expected change (e.g., increase) in network coverage time such as transportation system provider hours (e.g., duration of time that a limited-eligibility provider device is expected to stay online), value per provider hour represents a value to the transportation matching system 102 for a single provider hour, P(acceptance) represents an acceptance probability, P(cancelation) represents a cancelation probability, request value represents a value to the transportation matching system 102 associated with the transportation request, and negative retention impact represents an expected change (e.g., decrease) in full-eligibility provider hours resulting from providing the transportation request to a limited-eligibility provider device.

In some implementations, the request distribution system 104 determines the value per provider hour based on a volume of transportation requests and corresponding network coverage available (e.g., for a particular time period and/or a particular geographic region). In particular, the request distribution system 104 determines the value per provider hour by determining a number of available transportation system provider hours for a particular time and/or region and further determining a number of transportation requests received for the same time and/or region. For example, the request distribution system 104 determines a value per provider hour based on a ratio of received requests per available transportation system provider hour (or number of provider devices). In some cases, the request distribution system 104 determines a higher value per provider hour when and where fewer provider devices are available to service transportation requests, especially for when and where larger numbers of transportation requests are received. In some cases, the request distribution system 104 utilizes a provider-hour-value determination model (e.g., a machine learning model) to determine a value per provider hour for a certain time period and/or geographic region based on a combination of available transportation providers (e.g., available transportation system provider hours) and received transportation requests for the time and region.

In one or more embodiments, the request distribution system 104 trains the request metric model 400, the acceptance probability model 404, the cancelation probability model 410, the reliability metric model 416, and/or the coverage time model 422. For example, in some cases, the machine learning models are neural networks and the request distribution system 104 trains the machine learning models utilizing an iterative training process to reduce loss of predictions with respect to ground truth data. To elaborate, the request distribution system 104 utilizes sample data such as sample provider hour factors to input into the coverage time model 422.

In turn, the coverage time model 422 generates a prediction for an expected change in network coverage time (e.g., transportation system provider hours) based on the sample provider hour factors. The request distribution system 104 then compares the prediction with a ground truth change in network coverage time (e.g., transportation system provider hours) indicating an actual change that resulted from the sample provider hours. For example, the request distribution system 104 utilizes a loss function such as a cross entropy loss function or a mean squared error loss function to perform the comparison and determine a measure of loss associated with the prediction.

Further, the request distribution system 104 back propagates to modify parameters (e.g., internal weights and biases) of the provider hours model 422 to reduce (e.g., minimize) the measure of loss. Based on modifying the parameters, the request distribution system 104 further selects another set of sample provider hour factors to input into the coverage time model 422 to generate a new prediction, compare the prediction with a respective ground truth, and modify parameters to reduce the resultant loss. The request distribution system 104 repeats this training process of inputting sample data, generating predictions, determining losses relative to ground truths, and modifying network parameters, for a number of iterations and/or until the request distribution system 104 satisfies a threshold measure of loss (or a threshold accuracy).

In some cases, the request distribution system 104 trains each of the illustrated machine learning models in this way. For instance, the request distribution system 104 accesses training data for each of the illustrated machine learning models to train them separately. Specifically, the request distribution system 104 utilizes sample acceptance probability factors corresponding to ground truth acceptance probabilities to train the acceptance probability model 404. Similarly, the request distribution system 104 utilizes sample cancelation probability factors corresponding to ground truth cancelation probabilities to train the cancelation probability model 410. In like fashion, the request distribution system 104 utilizes sample request reliability factors corresponding to ground truth request reliability metrics to train the reliability metric model 416. Further, the request distribution system 104 utilizes sample provider hour factors corresponding to ground truth changes in transportation system provider hours to train the coverage time model 422.

Figure 5A:
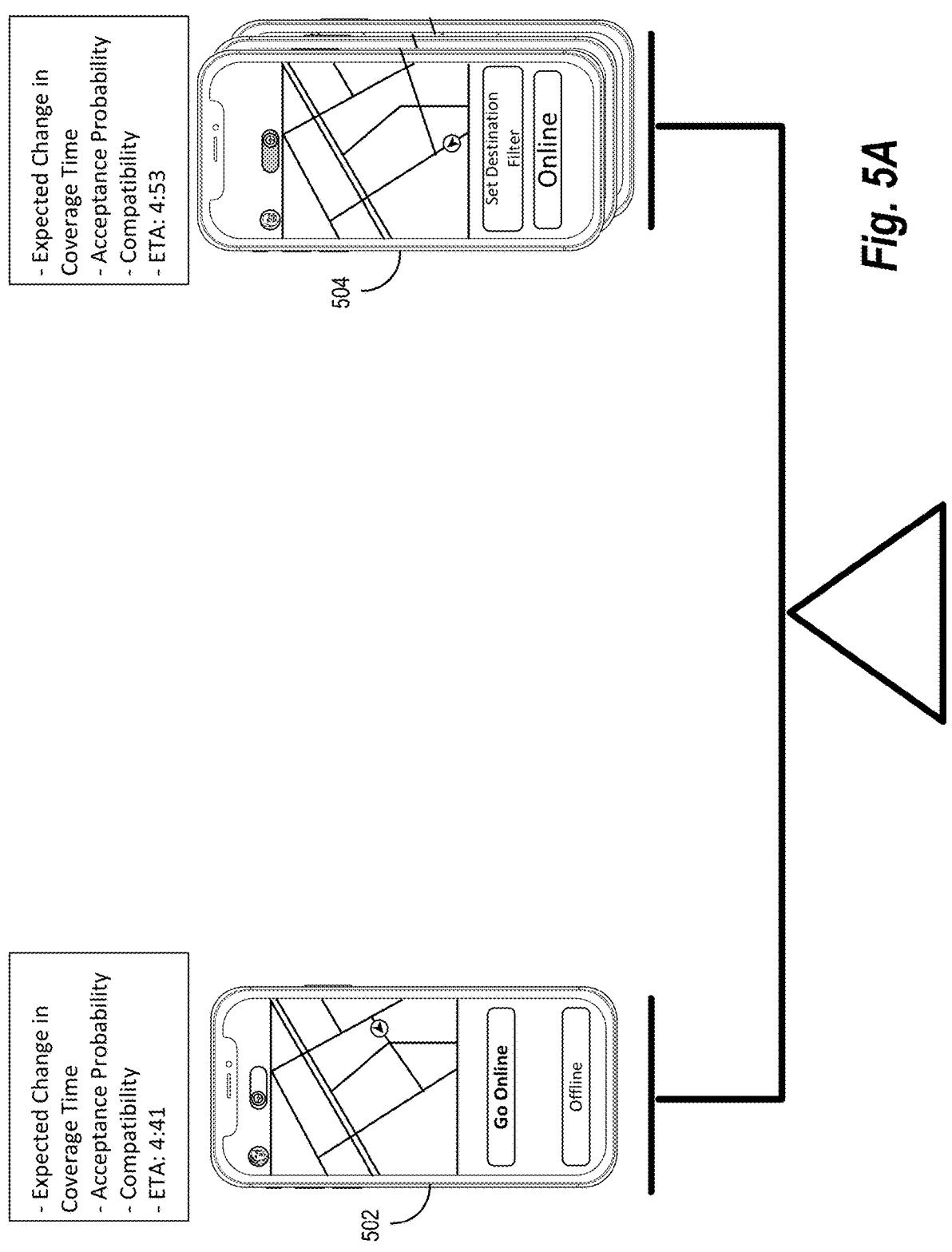
FIG. 5A illustrates an example comparison between a limited-eligibility provider device and one or more other provider devices in accordance with one or more embodiments.
Figure 5B:
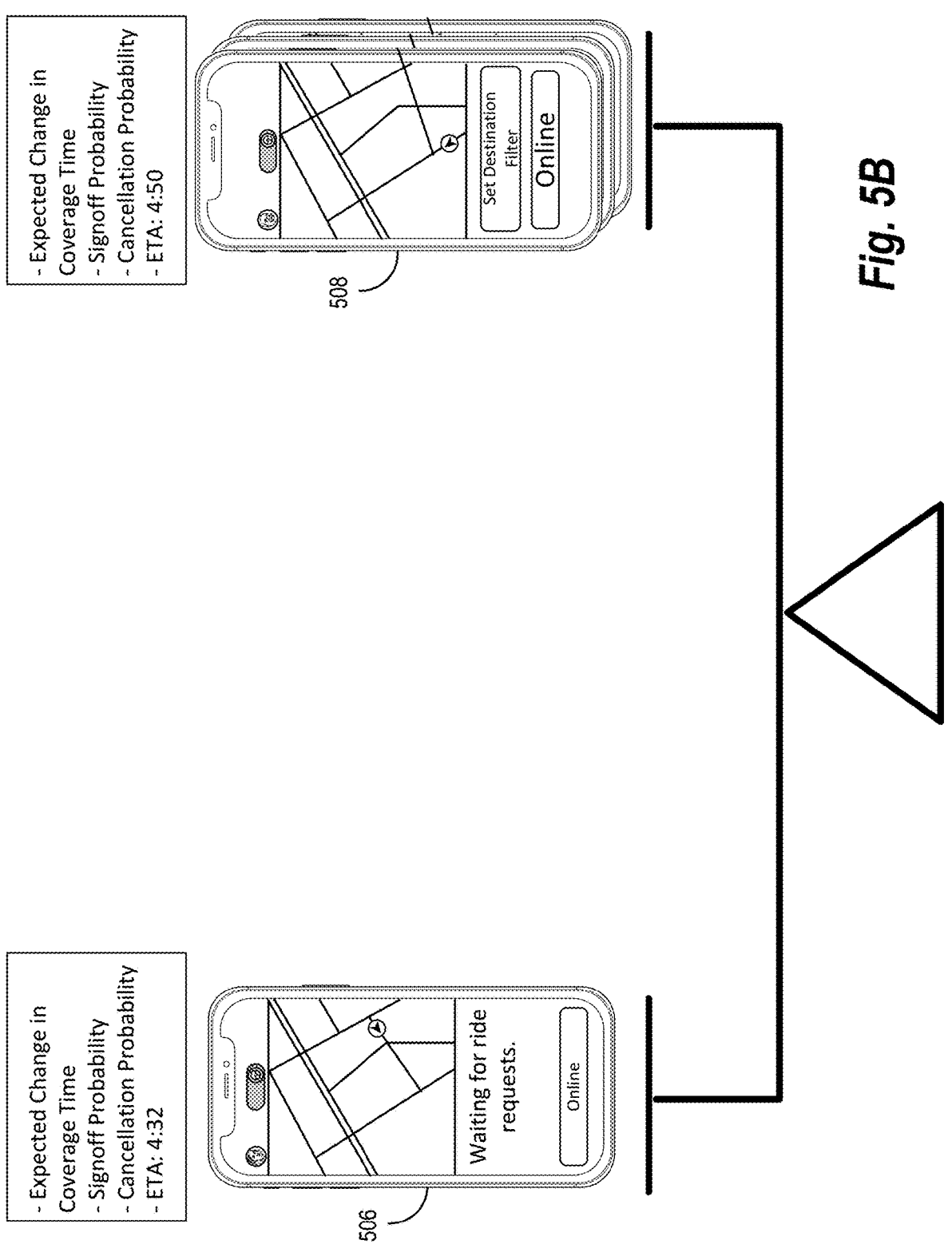
FIG. 5B illustrates an example comparison between an online and/or full-eligibility provider device and one or more other provider devices in accordance with one or more embodiments.

As mentioned, in certain described embodiments, the request distribution system 104 compares transportation request metrics and/or other factors associated with different provider devices. Indeed, the request distribution system 104 performs one or more comparisons to select a limited-eligibility provider device or a full-eligibility provider device as a recipient for a transportation request. FIGS. 5A-5B illustrate example comparisons between provider devices in accordance with one or more embodiments. For instance, FIG. 5A illustrates comparisons between a limited-eligibility provider device and one or more other provider devices (e.g., limited-eligibility provider devices and/or full-eligibility provider devices), while FIG. 5B illustrates comparisons between an online provider device and one or more other provider devices (e.g., limited-eligibility provider devices and/or full-eligibility provider devices).

As illustrated in FIG. 5A, the request distribution system 104 compares different transportation request metrics and/or other factors associated with different limited-eligibility provider devices and/or full eligibility provider devices. For example, the request distribution system 104 compares an expected change in network coverage time (e.g., transportation system provider hours) associated with a limited-eligibility provider device 502 with an expected change in network coverage time (e.g., transportation system provider hours) associated with a limited-eligibility provider device 504 (or a full-eligibility provider device). Based on the comparison, the request distribution system 104 determines whether to provide the transportation request to a limited-eligibility provider device or to a full-eligibility provider device. Additionally, the request distribution system 104 selects a limited-eligibility provider device (e.g., limited-eligibility provider device 502) as a recipient for the transportation request based on the comparison of the expected change in network coverage time by, for example, selecting the limited-eligibility provider device that results in the largest increase in network coverage time such as transportation system provider hours (or largest expected increase in expected system value/efficiency).

As further illustrated in FIG. 5A, the request distribution system 104 compares an acceptance probability associated with the limited-eligibility provider device 502 with an acceptance probability associated with the limited-eligibility provider device 504 (or a full-eligibility provider device). Based on the comparison, the request distribution system 104 selects a provider device as a recipient for the transportation request. For example, the request distribution system 104 selects the limited-eligibility provider device 502 to receive the transportation request based on determining that the limited-eligibility provider device 502 has a higher acceptance probability than the limited-eligibility provider device 504. In some cases, the request distribution system 104 selects the limited-eligibility provider device 502 based on determining that the combination (e.g., product) of the acceptable probability and the expected change in provider hours is higher than the corresponding combination for the limited-eligibility provider device 504.

Further, the request distribution system 104 compares a compatibility of the limited-eligibility provider device 502 in relation to a received transportation request with a compatibility of the limited-eligibility provider device 504 (or a full-eligibility provider device) in relation to the transportation request. In particular, the request distribution system 104 determines a compatibility for the limited-eligibility provider device 502 by determining a request type of the transportation request and determining whether the limited-eligibility provider device 502 is accepting transportation requests of the request type. Further, the request distribution system 104 compares the compatibility of the limited-eligibility provider device 502 with the compatibility of the limited-eligibility provider device 504 to determine that the request type is more compatible with the provider device status of the limited-eligibility provider device 502 than that of the limited-eligibility provider device 504. For example, the request distribution system 104 determines a limited-eligibility provider device 504 in high value mode is more likely to accept a shared-ride request type, even though the shared ride request type does not satisfy the criteria for a high value ride. Accordingly, the system can find a compatibility between the request type and the provider device status and generate a transportation request notification based on the compatibility. The request distribution system 104 thus provides the transportation request to the limited-eligibility provider device 502.

As further illustrated in FIG. 5A, the request distribution system 104 compares an arrival time (e.g., estimated time of arrival or "ETA") for the limited-eligibility provider device 502 with an arrival time associated with another limited-eligibility provider device 504 (or a full-eligibility provider device). For example, the request distribution system 104 determines an arrival time for the limited-eligibility provider device 502 to arrive at the pick-up location to service the transportation request (if the limited-eligibility provider device 502 were selected to service the request) and further determines an arrival time for the limited-eligibility provider device 504 to arrive at the pick-up location as well. The request distribution system 104 compares the arrival times to select the limited-eligibility provider device 502 based on determining that its arrival time is sooner (or shorter) than that of the limited-eligibility provider device 504. In some cases, the request distribution system 104 filters limited-eligibility provider devices based on arrival time by removing from consideration, or excluding, limited-eligibility provider devices whose arrival time exceeds a threshold arrival time.

In one or more implementations, the request distribution system 104 selects a limited-eligibility provider device to receive a transportation request based on comparing other transportation request metrics as well, such as those determined as described in relation to FIG. 4. In some cases, the request distribution system 104 generates a weighted combination of transportation request metrics and/or other factors such as arrival time and compatibility for a plurality of provider devices (e.g., limited-eligibility provider devices and full-eligibility provider devices). In addition, the request distribution system 104 compares the weighted combinations to select a provider device (e.g., the limited-eligibility provider device 502) to receive the transportation request. For instance, the request distribution system 104 determines and compares weighted combinations of compatibility, acceptance probability, arrival time, and expected change in network coverage time (e.g., transportation system provider hours) to select a provider device. Thus, even if one provider device has a longer arrival time than another, the request distribution system 104 can still select that device based on the combination of factors (e.g., because the device has a higher acceptance probability and/or a better expected change in transportation system provider hours).

As illustrated in FIG. 5B, the request distribution system 104 compares transportation request metrics (and other factors) associated with an online provider device 506 with corresponding factors associated with an additional provider device 508 (e.g., other online provider devices and/or limited-eligibility provider devices). For instance, the request distribution system 102 compares factors such as an expected change in network coverage time, a signoff probability, a cancelation probability, and an arrival time ("ETA").

As shown, the request distribution system 104 determines the expected change in network coverage time for the online provider device 506 and for the additional provider device 508 (and for other provider devices) as described herein. In some cases, the request distribution system 104 further compares the expected changes to select a provider device that results in the largest increase in network coverage time (e.g., transportation system provider hours) as a recipient for a transportation request. In some cases, the request distribution system 104 considers one or more additional factors together with (or in lieu of) the expected change in network coverage time, such as a signoff probability, a cancelation probability, and an arrival time.

For example, the request distribution system 104 determines a signoff probability for the online provider device 506 and the additional provider device 508 (and other provider devices) to compare. In one or more embodiments, the request distribution system 104 determines a signoff probability based on signoff probability factors. In some cases, the request distribution system 104 provides a transportation request to a provider device with a higher signoff probability to prevent the provider device from signing off/going offline (or to incentivize the provider device to remain signed in/online). As mentioned above, the request distribution system 104 can determine a signoff probability utilizing a machine learning model or a heuristic model that analyzes various signoff probability factors, such as idle time.

In one or more embodiments, the request distribution system 104 utilizes a boost framework in utilizing network coverage time and signoff probability to transmit transportation requests to certain provider devices. For instance, as part of a matching algorithm for determining which provider device matches to which transportation request, the request distribution system 104 can penalize starts of shifts (e.g., to shift transportation requests that might otherwise be provided to provider devices with newer/shorter shifts to provider devices with older/longer shifts).

In some embodiments, for a given provider device, the request distribution system 104 reduces a boost at shift start+x minutes and increases a boost at shift start+y minutes (e.g., to reduce a likelihood of penalizing provider devices after a second, third, or subsequent transportation request). In one or more embodiments, the request distribution system 104 adjusts such a boost not only for shift starts (or starts of active sessions) but also for all micro sessions (e.g., sessions that have a duration of less than a threshold shift duration and/or that have not previously been assigned a transportation request). In one or more embodiments, the request distribution system 104 reduces a boost for provider devices after completion of individual transportation requests.

In some embodiments, the request distribution system 104 boosts provider devices with older/longer shifts (or active sessions) to increase the likelihood of receiving transportation requests. In certain cases, the request distribution system 104 boosts provider devices with a signoff probability that satisfies a threshold signoff probability. In certain cases, the request distribution system 104 utilizes a boost given by:

$$boost = f(time\ since\ shift\ start, region) * cost\ per\ individual\ provider\ hour * avg(p2 + p3) * acceptance\ probability$$

where time since shift start indicates a duration of time that has elapses since a start of a shift, region represents a geographic regions associated with a provider device, cost per individual provider hour represents a cost to the transportation matching system 102 of keeping a provider device active for an hour, and avg(p2+p3) represents an average of P2 time (e.g., time a provider device is navigating to a pickup location for a transportation request) and P3 time (e.g., time a provider device is navigating to a drop-off location for a transportation request while transporting a requester).

For individual geographic regions, the request distribution system 104 can utilize a boost function specific to the geographic region. For instance, the request distribution system 104 utilizes a boost function with the following rules:

$$\text{if } t \leq median(P1) \rightarrow boost = 0$$

$$\text{if } median(P1) < t \leq decay\_boost \rightarrow boost =$$

$$(S(t) - LB) * avg(P2 + P3) * cost\ per\ individual\ provider\ hour * \alpha$$

$$\text{if } decay\_boost < t \leq end\_boost - t \rightarrow boost =$$

$$(S(decay\_boost) - LB) * avg(P2 + P3) * cost\ per$$

$$individual\ provider\ hour * \frac{end\_boost - t}{end\_boost - decay\_boost} * \alpha$$

where t represents a time since shift start, S(t) represents a sign out ratio after t minutes of P1 (e.g., time a provider device is active and waiting to receive a transportation request), LB represents an expected S(t) for t≤median(P1), decay_boost represents a time to start decaying a boost, end_boost represents a time to end a boost, a represents an adjustment value (e.g., 0.5, 1.0, 1.5, or 2.0), and the other terms are as defined above. In some cases, P1 time is idle time as defined above.

In certain embodiments, the aforementioned boost function can include consideration for additional factors. For example, the request distribution system 104 boosts provider devices based not only on signoff probability but also signoff reasons/types and start reasons/types. For example, the request distribution system 104 determines start reasons for a provider device including shift starts, prior completed requests, and/or prior lapses (e.g., prior instances where a provider device receives but never accepts transportation requests). Likewise, signoff reasons include a list ride indication from the provider device indicating that a current transportation request is a final request to complete before signoff, a non-compliance indicator that a provider device is non-compliant with one or more rules or regulations, a manual signoff (e.g., a selection of a signoff element), or an out-of-service-area indicator indicating that the provider device has traveled outside a designated geographic area.

As further illustrated in FIG. 5B, the request distribution system 104 compares cancelation probabilities and arrival times across provider devices as well. Indeed, similar to the discussion regarding FIG. 5A, the request distribution system 104 compares a cancelation probability of the online provider device 506 with that of the additional provider device 508. In some cases, the request distribution system 104 provides a transportation request to whichever provider device results in a lower cancelation probability for the transportation request. Similarly, in certain embodiments, the request distribution system 104 can select a provider device with a shorter arrival time as a recipient for a transportation request. As mentioned, to determine which provider device to provide a transportation request to, the request distribution system 104 can determine and consider two or more of the aforementioned factors in combination.

In some embodiments, the request distribution system 104 further performs additional functions in conjunction with, or based on, selecting a provider device as a recipient for a transportation request. For example, the request distribution system 104 can prioritize a selected provider device after receiving an acceptance of a surfaced transportation request from the provider device. Indeed, to improve transportation system provider hours (e.g., by increasing future request matches) and increase network coverage, the request distribution system 104 prioritizes the provider device.

By prioritizing a limited-eligibility provider device that has accepted a transportation request, the request distribution system 104 decreases a signoff probability associated with the limited-eligibility provider device. Indeed, the request distribution system 104 determines signoff probabilities for provider devices indicating likelihoods or probabilities that provider devices will sign off within a certain amount of time (e.g., 10 seconds, 30 seconds, or 1 minute) or after a servicing a current transportation request. The request distribution system 104 further reduces the signoff probability of a limited-eligibility provider device by prioritizing the limited-eligibility provider device when surfacing transportation requests after the initial request accepted by the limited-eligibility provider device. In some cases, the request distribution system 104 gives the device prioritized pick of requests, provides more preferred requests, and/or provides higher provider compensation requests to the previously limited-eligibility provider device (e.g., for a certain number of successive requests, for a threshold duration of time, and/or for a remainder of an online provider session once transitioning to full eligibility).

In certain implementations, the request distribution system 104 can attach a bonus compensation to a transportation request to increase an acceptance probability. Indeed, the request distribution system 104 can identify certain transportation requests that are better candidates for providing to limited-eligibility provider devices and can provide a compensation bonus along with the request as added incentive to modify a provider device status (e.g., to go online) and accept the transportation request.

In some embodiments, the request distribution system 104 can identify certain request types such as wait-and-save requests (e.g., transportation requests where the requester device indicates a willingness to wait for a longer-than-normal period of time in exchange for less expensive transportation) as candidates for limited-eligibility provider devices. Indeed, in these or other embodiments, the request distribution system 104 provides only certain request types such as wait-and-save rides to limited-eligibility provider devices while providing other request types to full-eligibility provider devices. For example, the request distribution system 104 can preserve wait-and-save requests (or requests of other request types) exclusively for limited-eligibility provider devices.

In one or more embodiments, the request distribution system 104 performs a provider device swap (e.g., transfers a transportation request from a first provider device to a second provider device). To elaborate, the request distribution system 104 determines, after acceptance by a full-eligibility provider device, that a limited-eligibility provider device is a better candidate for servicing the transportation request. For instance, the request distribution system 104 determines that providing the transportation request to the limited-eligibility provider device would result in at least a threshold increase in transportation system provider hours. As another example, the request distribution system 104 determines that providing the transportation request to the limited-eligibility provider device would result in at least a threshold improvement to arrival time (or other transportation metric) as compared to the full-eligibility provider device. The request distribution system 104, therefore, reassigns the transportation request to the limited-eligibility provider device and provides the transportation request to the limited-eligibility provider device, removing the request from the full-eligibility provider device. In some cases, the request distribution system 104 further compensates the full-eligibility provider device for the swap (e.g., the unilateral cancelation from the system). In other cases, the request distribution system 104 replaces a swapped request with another request for the full-eligibility provider device.

In some cases, the request distribution system 104 only swaps a request before a provider device has begun servicing the request (e.g., before the provider device has begun navigating to the pick-up location for the request). In these or other cases, the request distribution system 104 selects only specific transportation requests as candidates for swaps. For example, the request distribution system 104 only performs swaps for transportation requests of a particular request type such as a linked request for a transportation request to occur after servicing a current transportation request. As another example, the request distribution system 104 only performs swaps for transportation requests having a particular (e.g., threshold) provider compensation.

In certain embodiments, the request distribution system 104 swaps requests from full-eligibility provider devices based on certain swapping factors. For example, the request distribution system 104 determines swapping factors such as a threshold provider rating and/or a threshold provider account age. Additionally (or alternatively), the request distribution system 104 determines a swapping factor such as a threshold duration of online status time over a measurement period and/or a threshold number of transportation requests served over a particular time period (or for a current online provider session).

In some implementations, the request distribution system 104 decays the prioritization of a limited-eligibility provider device. More specifically, to prevent swaps or assignments from stacking one after the other, the request distribution system 104 decays the prioritization of a limited-eligibility provider device so that once a request is swapped from one provider device to another, it is not likely to be swapped away again. For example, the request distribution system 104 prevents swapping from one limited-eligibility provider device to another limited-eligibility provider device in quick succession by (slowly) decaying the priority of a limited-eligibility provider device so that the limited-eligibility provider device retains a transportation request. If the priority were zeroed out immediately upon receipt of a request, then the request distribution system 104 may otherwise swap requests too quickly in exchange for other limited-eligibility provider device with higher priority.

In one or more embodiments, the request distribution system 104 provides a transportation request to a provider device as an incentive to activate a particular token associated with the provider account of the provider device. For example, the request distribution system 104 selects a particular transportation request that has at least a threshold acceptance probability in relation to a provider device (e.g., a limited-eligibility provider device or a full-eligibility provider device) to provide to the provider device in exchange for activating a power mode token or some other special token associated with the provider account. In some embodiments, a power mode token refers to a provider device status modification element that, upon activation or selection, increases the rate or priority of receiving transportation matches for a provider device for a particular time period (or a particular provider session). In some cases, the request distribution system 104 provides additional provider compensation in exchange for activating the power mode token.

Figure 6:
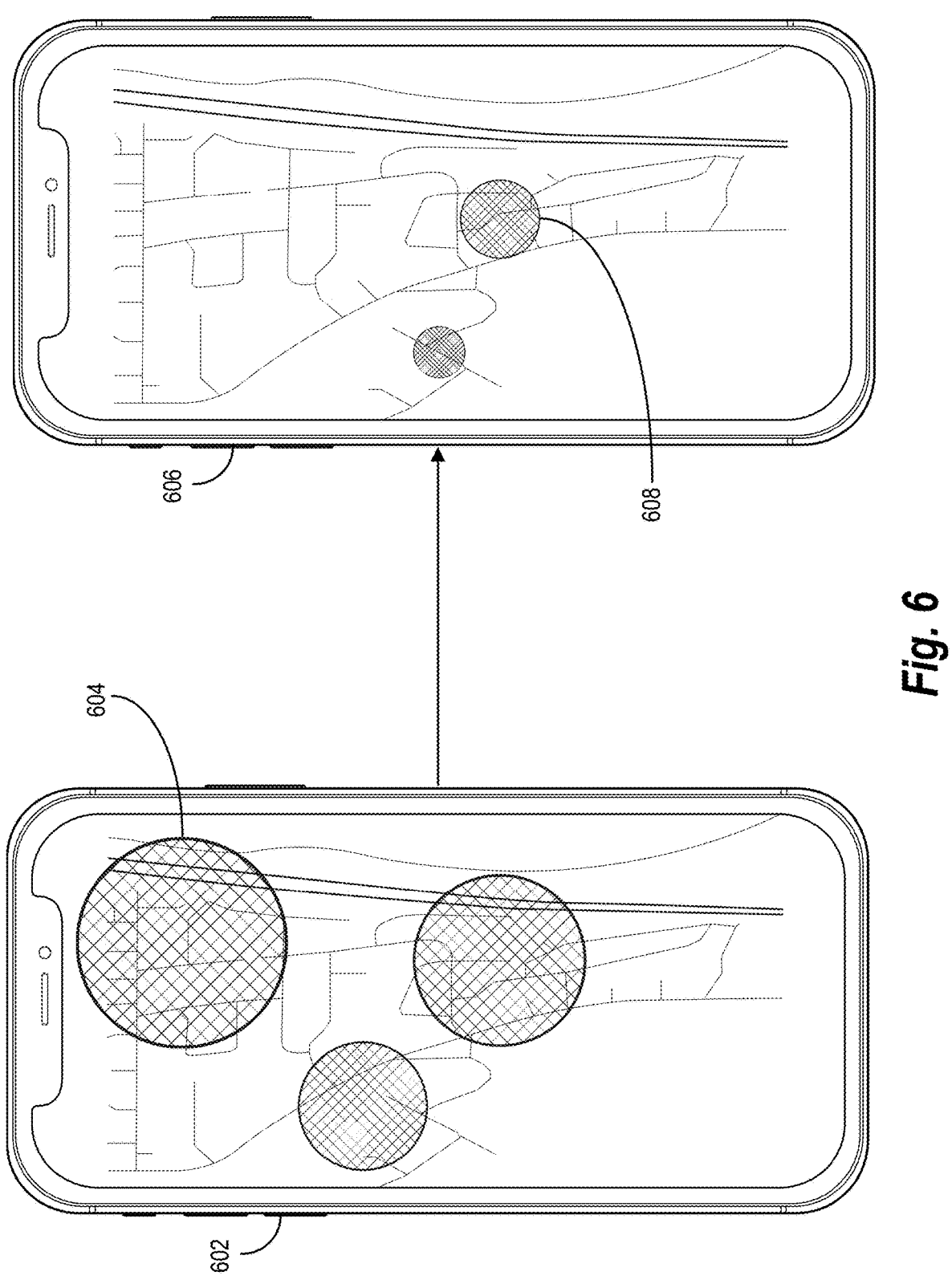
FIG. 6 illustrates an example comparison of network coverage in accordance with one or more embodiments.

As mentioned above, in certain embodiments, the request distribution system 104 improves network coverage as compared to conventional systems. In particular, the request distribution system 104 improves network coverage by activating limited-eligibility provider devices through providing transportation requests to the limited-eligibility provider devices. FIG. 6 illustrates a comparison of network coverage between a conventional system and the request distribution system 104 in accordance with one or more embodiments.

As illustrated in FIG. 6, the provider device 602 displays a coverage map depicting low coverage zones where a conventional transportation network system has too few transportation providers to adequately service received transportation requests, such as the low coverage zone 604. As shown, the map on the provider device 602 illustrates large areas covered by the low coverage zones, which, as described above, contributes to the inefficiency of conventional systems in efforts to compensate for the low coverage.

As further illustrated in FIG. 6, the provider device 606 displays a coverage map depicting fewer, smaller low coverage zones, such as the low coverage zone 608. Indeed, the provider device 606 is part of the request distribution system 104, and as a result of providing transportation requests to limited-eligibility provider devices and/or activating the limited-eligibility provider device to full eligibility status, the request distribution system 104 improves network coverage. Indeed, the map displayed on the provider device 606 depicts the same geographic region as the map on the provider device 602 with the same (or similar) number of full-eligibility provider devices to service the region. However, as a result of selecting and utilizing limited-eligibility provider devices as described herein, the request distribution system 104 increases network resource and improves network coverage. Thus, the low coverage zones, such as the low coverage zone 608 are smaller and fewer in number on the provider device 606 associated with the request distribution system 104.

Figure 7B:
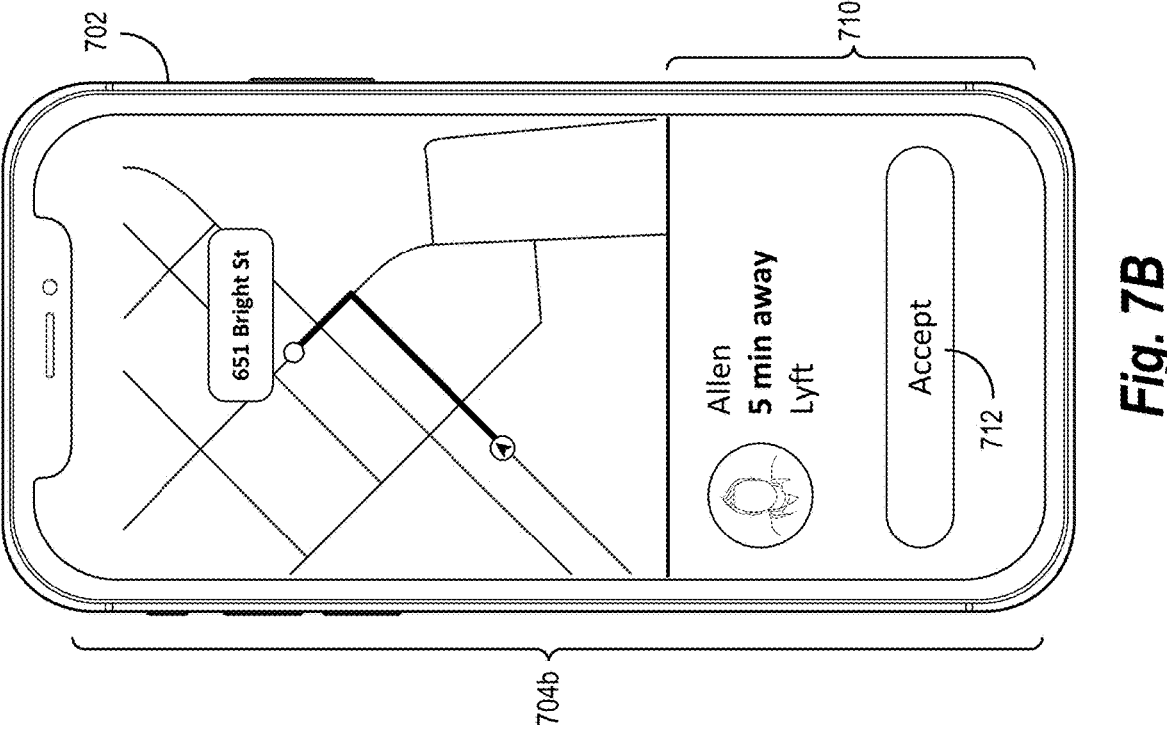
FIGS. 7A-7B illustrate example transportation request notifications in accordance with one or more embodiments.
Figure 7A:
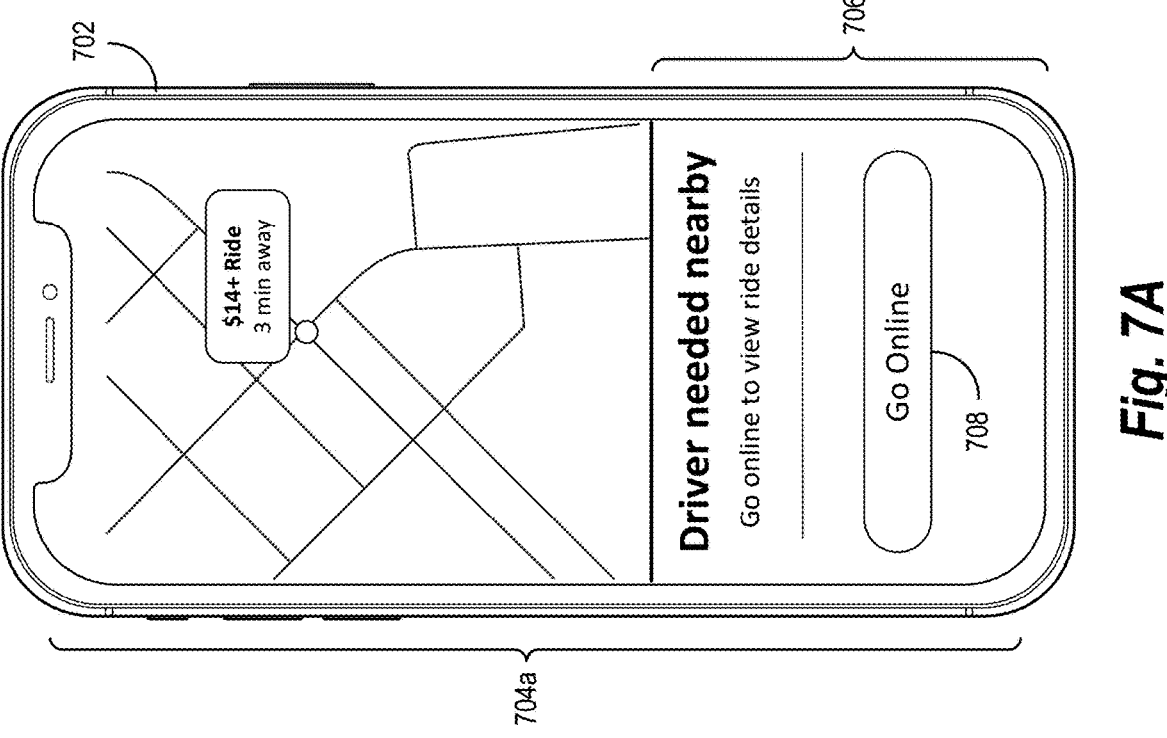
Figure 8:
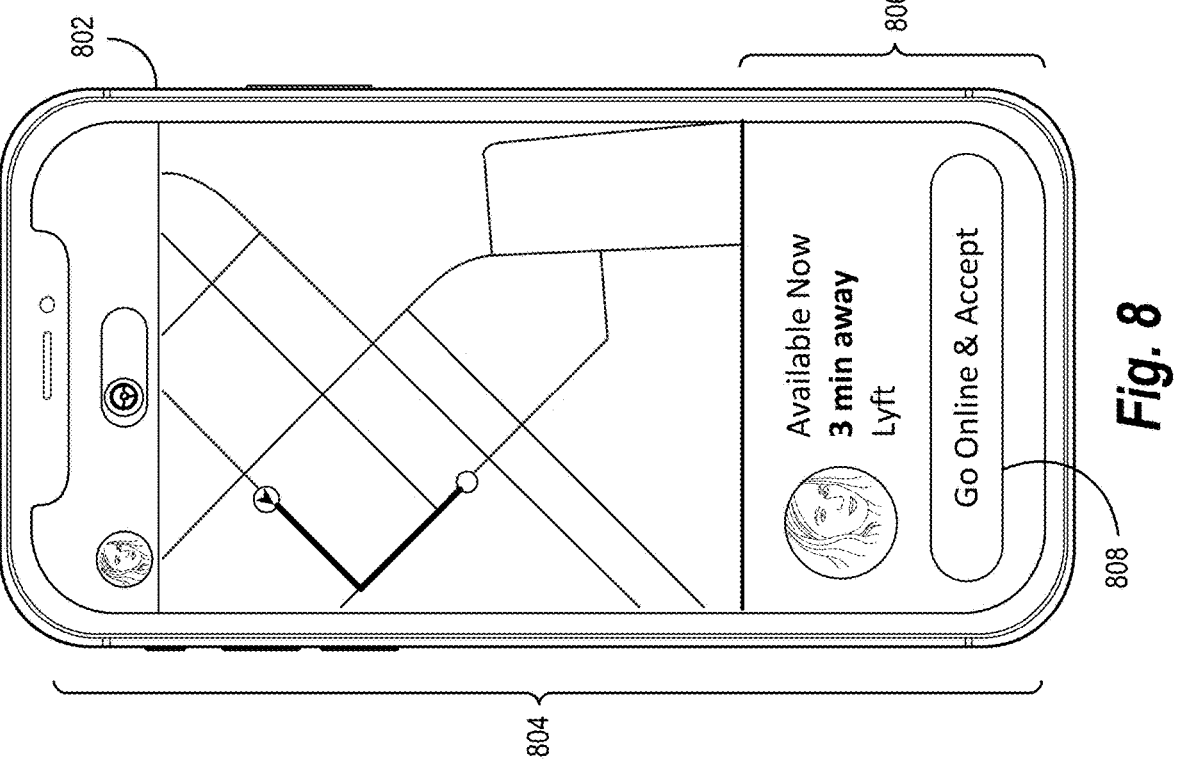
FIG. 8 illustrates an example transportation request notification in accordance with one or more embodiments.

As mentioned, in certain embodiments, the request distribution system 104 can provide a transportation request notification to a provider device upon selecting the provider device as a recipient of a transportation request. In particular, the request distribution system 104 can provide a transportation request notification that includes a selectable element to modify a provider device status (e.g., from offline to online) and/or to accept a transportation request. FIGS. 7A-7B illustrate a sequence of provider interfaces including transportation request notifications in accordance with one or more embodiments. Thereafter, FIG. 8 illustrates another provider interface including a different transportation request notification in accordance with one or more embodiments.

As illustrated in FIG. 7A, the request distribution system 104 provides a transportation request notification 706 for display on the provider device 702 (e.g., a limited-eligibility provider device). Indeed, the provider device 702 displays a provider interface 704a that includes a map portion and a transportation request notification 706. As shown, the provider device 702 has an offline provider device status indicating that the provider device 702 is not currently accepting transportation requests. Thus, the request distribution system 104 provides the transportation request notification 706 indicating a transportation request for the provider device 702 and including a status modification element 708 selectable to modify the provider device status of the provider device 702 (e.g., from offline to online).

As illustrated in FIG. 7B, the request distribution system 104 further provides an additional transportation request notification 710 after receiving an indication of user selection of the status modification element 708 within the first transportation request notification 706. Indeed, the provider device 702 in FIG. 7B displays a provider interface 704b that includes the transportation request notification 710. Within the transportation request notification, the request distribution system 104 also provides an accept element 712 selectable to accept the transportation request. Thus, as illustrated in FIGS. 7A-7B, the request distribution system 104 provides a first transportation request notification 706 to modify a provider device status and provides a second transportation request notification 710 to accept a transportation request (based on a modification of the provider device status).

In some embodiments, the request distribution system 104 does not provide an accept option for the provider device 702 to accept the transportation request without first determining that the provider device 702 has modified its provider device status to a status compatible with accepting transportation requests (e.g., online). In certain cases, the request distribution system 104 determines that the provider device 702 has a provider device status indicating acceptance of specific request types. In these cases, if the request distribution system 104 determines that a surfaced transportation request is not among the specific request types compatible with the provider device status, the request distribution system 104 provides a transportation request notification to modify the provider device status to a compatible status. For example, if the request distribution system 104 determines that the provider device 702 is in high value mode but the surfaced transportation request does not satisfy the threshold compensation amount for a high value request, the request distribution system 104 first provides a transportation request notification including a status modification option to transition from high value mode to normal mode. If, on the other hand, the request distribution system 104 determines that the surfaced transportation request is compatible with the provider device status, then the request distribution system 104 need not provide a status modification element and instead only provides a transportation request notification to accept the transportation request.

As illustrated in FIG. 8, the request distribution system 104 can provide a single notification to both modify a provider device status and accept a transportation request, rather than providing two separate notifications as illustrated previously in FIGS. 7A-7B. Indeed, as illustrated in FIG. 8, the provider device 802 displays a provider interface 804 that includes a transportation request notification 806. The transportation request notification 806 includes a status-modification-and-request-acceptance element 808 selectable to, with a single user interaction, modify a provider device status and accept a transportation request.

In some embodiments, the request distribution system 104 provides a transportation request notification (such as those illustrated in FIGS. 7A-7B and FIG. 8) only while a provider device is running the provider application 110. In other embodiments, the request distribution system 104 can provide transportation request notifications in the form of push notifications, email notifications, or other notifications even while a provider device is not running the provider application 110. For example, the request distribution system 104 can provide a transportation request notification to prompt a provider device to open the provider application, modify a provider device status, and accept a transportation request.

As mentioned above, in some embodiments, the request distribution system 104 provides a limited-duration transportation request notification. For example, the request distribution system 104 provides a transportation request notification (e.g., the transportation request notification 706, 710, or 806) to be displayed only for a certain duration of time (e.g., 30 seconds or 1 minute). If the request distribution system 104 does not receive a user selection of a status modification element or an acceptance element during the duration of time, then the request distribution system 104 removes or revokes the transportation request notification to provide to a different provider device. Thus, the request distribution system 104 ensures prompt response to transportation request, even from limited-eligibility provider devices, to prevent undue delay for requesters. In some embodiments, the request distribution system 104 ensures that a transportation request notification is displayed at least for a minimum duration of time (e.g., 10 seconds) so that a provider has enough time to respond and accept or deny a transportation request.

In one or more embodiments, the request distribution system 104 further provides an indication that a limited-eligibility provider device (e.g., the limited-eligibility provider device 702 or 802) will not be penalized for declining transportation requests when in a limited-eligibility state. For example, the request distribution system 104 provides a no penalty indication as part of a transportation request notification (e.g., as described in relation to FIGS. 7A-7B and FIG. 8) to inform a provider that no penalty is attached to declining a transportation request via a limited-eligibility provider device. Indeed, the request distribution system 104 only benefits limited-eligibility provider devices and does not require acceptance of transportation requests when in a limited-eligibility state. Additionally, in some cases, the request distribution system 104 further provides an indication (e.g., within a provider interface 704a, 704b, or 804) that a limited-eligibility provider device receives fewer transportation requests than a full-eligibility provider device.

Figure 9:
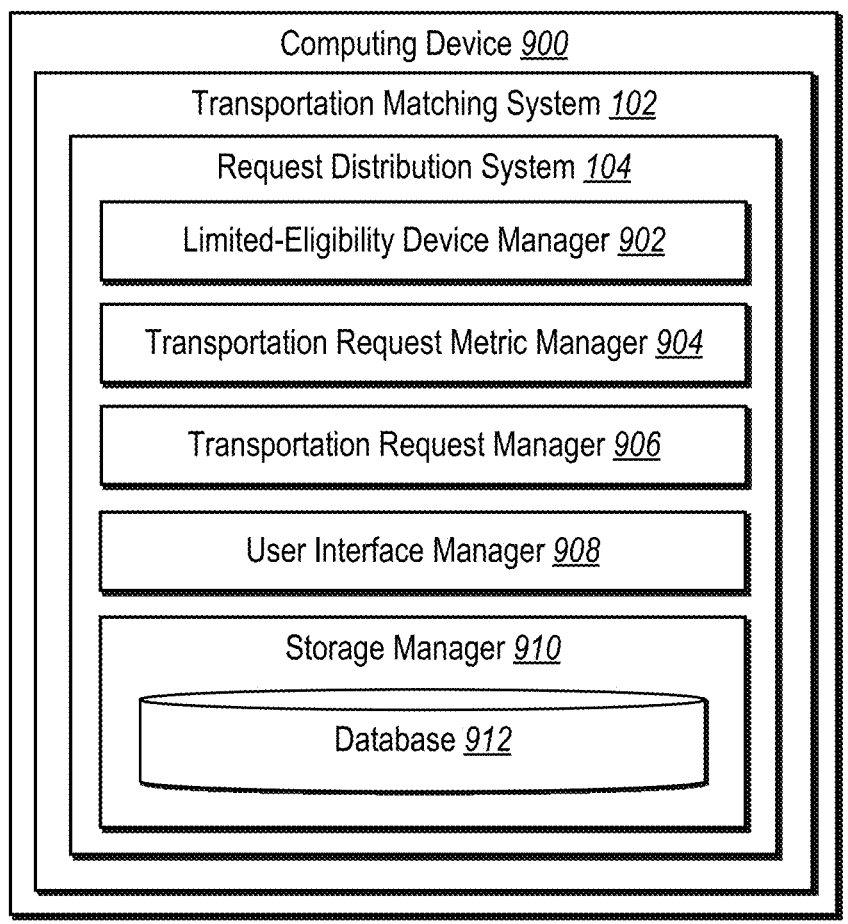
FIG. 9 illustrates a block diagram of an example computing device including various components of a request distribution system in accordance with one or more embodiments.

Looking now to FIG. 9, additional detail will be provided regarding components and capabilities of the request distribution system 104. Specifically, FIG. 9 illustrates an example schematic diagram of the request distribution system 104 on an example computing device 900 (e.g., one or more of the provider devices 108a-108n, the requester device 112, and/or the server(s) 106). As shown in FIG. 9, the request distribution system 104 may include a limited-eligibility device manager 902, a transportation request metric manager 904, a transportation request manager 906, a user interface manager 908, and a storage manager 910.

As just mentioned, the request distribution system 104 includes a limited-eligibility device manager 902. In particular, the limited-eligibility device manager 902 manages, maintains, identifies, selects, determines, or detects limited-eligibility provider devices associated with the transportation matching system 102. For example, the limited-eligibility device manager 902 determines a provider device status associated with a provider device and further determines whether the provider device is running (either actively or passively) the provider application 110 associated with the transportation matching system 102. As described herein, the limited-eligibility device manager 902 identifies a limited-eligibility provider device as a provider device that is compatible with accepting less than all request types, by virtue of its provider device status and/or whether the provider device is running the provider application 110.

As further illustrated in FIG. 9, the request distribution system 104 also includes a transportation request metric manager 904. In particular, the transportation request metric manager 904 manages, maintains, stores, accesses, determines, generates, predicts, detects, or identifies transportation request metrics associated with a transportation request. For example, the transportation request metric manager 904 determines an acceptance probability, a cancelation probability, a request reliability metric, and/or an expected change in transportation system provider hours associated with a received transportation request. In some cases, as described herein, the transportation request metric manager 904 determines device-specific transportation request metrics for a transportation request as well. In one or more embodiments, the transportation request metric manager 904 also determines other transportation request metrics such as an arrival time for a provider device to arrive at a pick-up location and/or a compatibility of a provider device to service a transportation request.

As shown, the request distribution system 104 further includes a transportation request manager 906. In particular, the transportation request manager 906 manages, maintains, receives, provides, distributes, generates, or identifies transportation requests. For example, the transportation request manager 906 receives a transportation request from the requester device 112, generates a transportation request notification for the transportation request, and provides the transportation request notification to a provider device (e.g., a limited-eligibility provider device).

Additionally, the request distribution system 104 includes a user interface manager 908. In particular, the user interface manager 908 manages, maintains, displays, presents, or causes to be displayed or presented one or more user interfaces. For example, the user interface manager 908 causes a provider device to display a provider interface that includes a transportation request notification. In some cases, the user interface manager 908 further causes a provider device to display a first transportation request notification to modify a provider device status and to subsequently (upon user selection of a status modification element) cause the provider device to display a second transportation request notification to accept a transportation request. In other cases, the user interface manager 908 causes a provider device to display a single transportation request notification including a single element to modify a provider device status and accept a transportation request.

Further, the request distribution system 104 includes a storage manager 910. In particular, the storage manager 910 communicates with other components of the request distribution system 104 to store and provide various information within or from the database 912 such as transportation requests, transportation request metrics, and transportation request notifications.

In one or more embodiments, each of the components of the request distribution system 104 are in communication with one another using any suitable communication technologies. Additionally, the components of the request distribution system 104 can be in communication with one or more other devices including one or more client devices described above. It will be recognized that although the components of the request distribution system 104 are shown to be separate in FIG. 9, any of the subcomponents may be combined into fewer components, such as into a single component, or divided into more components as may serve a particular implementation. Furthermore, although the components of FIG. 9 are described in connection with the request distribution system 104, at least some of the components for performing operations in conjunction with the request distribution system 104 described herein may be implemented on other devices within the environment.

The components of the request distribution system 104 can include software, hardware, or both. For example, the components of the request distribution system 104 can include one or more instructions stored on a computer-readable storage medium and executable by processors of one or more computing devices (e.g., the computing device 900). When executed by the one or more processors, the computer-executable instructions of the request distribution system 104 can cause the computing device 900 to perform the methods described herein. Alternatively, the components of the request distribution system 104 can comprise hardware, such as a special purpose processing device to perform a certain function or group of functions. Additionally or alternatively, the components of the request distribution system 104 can include a combination of computer-executable instructions and hardware.

Furthermore, the components of the request distribution system 104 performing the functions described herein may, for example, be implemented as part of a stand-alone application, as a module of an application, as a plug-in for applications including content management applications, as a library function or functions that may be called by other applications, and/or as a cloud-computing model. Thus, the components of the request distribution system 104 may be implemented as part of a stand-alone application on a personal computing device or a mobile device. Alternatively or additionally, the components of the request distribution system 104 may be implemented in any application that allows creation and delivery of marketing content to users, including, but not limited to, various applications.

FIGS. 1-9, the corresponding text, and the examples provide a number of different systems, methods, and non-transitory computer readable media for selecting and providing a transportation request to a limited-eligibility provider device. In addition to the foregoing, embodiments can also be described in terms of flowcharts comprising acts for accomplishing a particular result. For example, FIG. 10 illustrates a flowchart of an example sequence of acts in accordance with one or more embodiments.

Figure 10:
FIG. 10 illustrates an example flow of acts for selecting and providing a transportation request to a provider device in accordance with one or more embodiments.
Figure 10:
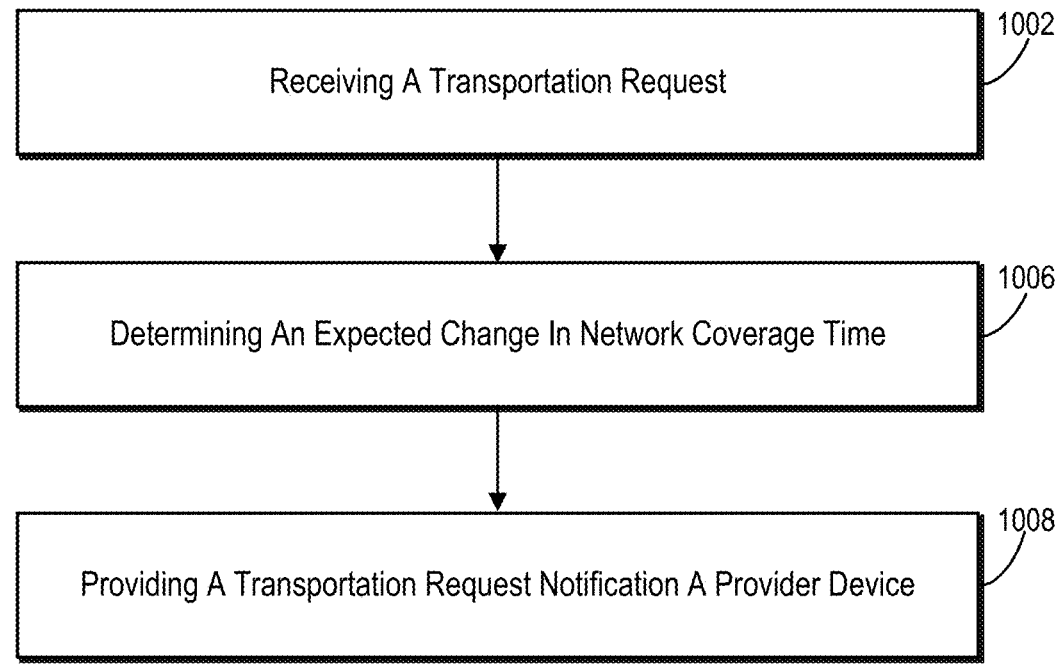

While FIG. 10 illustrates acts according to some embodiments, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 for selecting and providing a transportation request to a provider device. The series of acts 1000 can include an act 1002 of receiving a transportation request. In particular, the act 1002 can involve receiving a transportation request from a requester device associated with a transportation matching system.

Further, the series of acts 1000 can include an act 1006 of determining an expected change in network coverage time. In particular, the act 1006 can involve determining an expected change in network coverage time across a plurality of provider devices based on providing the transportation request to a provider device from the plurality of provider devices. For example, the act 1006 can involve determining an expected change in limited-eligibility provider hours resulting from providing the transportation request to the limited-eligibility provider device and an expected change in full-eligibility provider hours resulting from not providing the transportation request to a full-eligibility provider device. In some embodiments, the act 1006 involves determining an expected change in matching future transportation requests to the provider device based on providing the transportation request to the provider device.

In certain embodiments, the act 1006 involves determining an expected change in limited-eligibility provider hours resulting from providing the transportation request to the provider device, an expected change in full-eligibility provider hours resulting from not providing the transportation request to a full-eligibility provider device, and an expected change in matching future transportation requests to the provider device based on providing the transportation request to the provider device.

In some cases, the act 1006 involves determining an expected change in transportation system provider hours for the provider device and an additional provider device based on providing the transportation request to the provider device. The act 1006 can also involve determining a signoff probability associated with the provider device based on an idle time of the provider device. The act 1006 can also involve determining an expected change in transportation system provider hours based on providing the transportation request to the provider device and withholding the transportation request from other provider devices.

As further illustrated in FIG. 10, the series of acts 1000 can include an act 1008 of providing a transportation request notification to the provider device. In particular, the act 1008 can involve providing, based on the expected change in network coverage time, a transportation request notification to the provider device indicating the transportation request. For example, the act 1008 can involve providing a limited-duration request notification to the provider device selectable to modify the provider device status and accept the transportation request. Indeed, the series of acts 1000 can include acts of providing the transportation request notification by providing a limited-duration request notification for display on the provider device, receive an indication of user interaction selecting the transportation request notification, and in response to the indication of the user interaction and based on the provider device status, providing a request acceptance interface for display on the provider device and comprising a selectable option for accepting the transportation request. The act 1008 can involve providing the transportation request notification to the provider device is based on a signoff probability associated with the provider device based on an idle time of the provider device (and/or alternative or additional signoff probability factors).

In some embodiments, the series of acts 1000 can also include an act of identifying a limited-eligibility provider device. In particular, identifying a limited-eligibility provider device can involve identifying a limited-eligibility provider device having a provider device status that is ineligible to service the transportation request. In some embodiments, identifying a limited-eligibility provider device involves identifying the limited-eligibility provider device by identifying one of: a provider device that is actively running a mobile application associated with the transportation matching system, wherein the provider device status indicates that the provider device is not currently accepting transportation requests; a provider device that is not actively running the mobile application associated with the transportation matching system, wherein the provider device status indicates that the provider device is not currently accepting transportation requests; or a provider device that is actively running the mobile application associated with the transportation matching system, wherein the provider device status indicates that the provider device is currently accepting only transportation requests of a specific request type. In some cases, identifying a limited-eligibility provider device involves identifying the limited-eligibility provider device from among a plurality of limited-eligibility provider device having provider device statuses indicating ineligibility to service at least one request type.

In some embodiments, the series of acts 1000 includes an act of determining a request reliability metric associated with the transportation request indicating a likelihood that the transportation request will be available upon acceptance by the provider device (and/or for a threshold period of time). The series of acts 1000 can also include an act of providing the transportation request notification to the provider device based on the request reliability metric. For example, the series of acts 1000 can include an act of determining a request reliability metric associated with the transportation request based on one or more request reliability features comprising a time elapsed since receiving the transportation request, a number of threshold intent sessions within a geographic area associated with the transportation request, a number of provider devices within the geographic area waiting to be assigned transportation requests, a number of provider devices within the geographic area navigating to pick-up locations for transportation requests, a number of unassigned transportation requests in the geographic area, and a request type of the transportation request. Further, the series of acts 1000 can include an act of providing the transportation request notification to the provider device based on the request reliability metric.

Further, the series of acts 1000 can include an act of determining an acceptance probability for the transportation request being accepted by provider devices. In addition, the series of acts 1000 can include an act of providing the transportation request to the provider device based on the acceptance probability. For example, the series of acts 1000 includes acts of determining an acceptance probability for the provider device to accept the transportation request based on one or more of an arrival time to service the transportation request, a duration associated with servicing the transportation request, or a provider compensation for servicing the transportation request and selecting the provider device from among a plurality of provider devices based on the acceptance probability.

In one or more embodiments, the series of acts 1000 includes an act of comparing a first arrival time for the provider device to service the transportation request resulting with a second arrival time for another provider device to service the transportation request. Additionally, the series of acts 1000 can include an act of providing the transportation request to the provider device based on comparing the first arrival time and the second arrival time. In some cases, the series of acts 1000 includes an act of comparing a compatibility of the provider device status in relation to the transportation request with compatibilities of other provider device statuses for other provider devices in relation to the transportation request and an act of selecting the provider device based on comparing the compatibilities of the provider device statuses in relation to the transportation request.

In some embodiments, the series of acts 1000 includes an act of receiving an acceptance to service the transportation request from a full-eligibility provider device and an act of comparing a first arrival time for the full-eligibility provider device to service the transportation request with a second arrival time for the limited-eligibility provider device to service the transportation request. Further, the series of acts 1000 can include an act of reassigning the transportation request from the full-eligibility provider device to the limited-eligibility provider device based on comparing the first arrival time and the second arrival time.

Further, the series of acts 1000 can include an act of determining, utilizing a reliability metric machine learning model, a request reliability metric associated with the transportation request from one or more request reliability features and an act of providing the transportation request notification to the provider device based on the request reliability metric. In some cases, the series of acts 1000 includes an act of determining a cancelation probability associated with the transportation request and an act of providing the transportation request notification to the provider device based on the cancelation probability.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
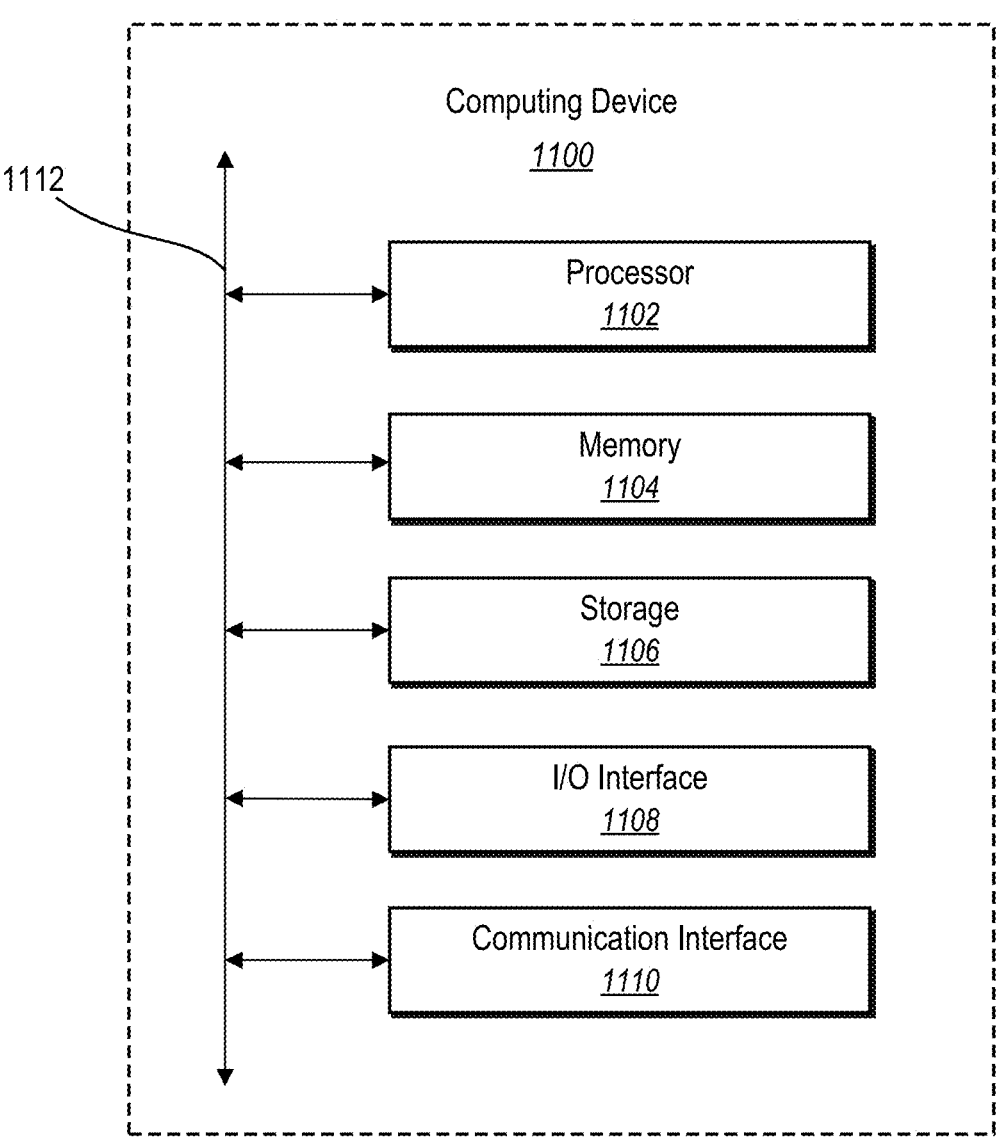
FIG. 11 illustrates a block diagram of a computing device for implementing one or more embodiments of the present disclosure.

FIG. 11 illustrates, in block diagram form, an exemplary computing device 1100 (e.g., the provider devices 108a-108n, the requester device 112, or the server(s) 106) that may be configured to perform one or more of the processes described above. One will appreciate that the request distribution system 104 can comprise implementations of the computing device 1100, including, but not limited to, the provider devices 108a-108n and/or the server(s) 106. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive ("HDD"), flash memory, a Universal Serial Bus ("USB") drive or a combination of these or other storage devices.

The computing device 1100 also includes one or more input or output interface 1108 (or "I/O interface 1108"), which are provided to allow a user (e.g., requester or provider) to provide input to (such as user strokes), receive output from, and otherwise transfer data to and from the computing device 1100. These I/O interface 1108 may include a mouse, keypad or a keyboard, a touch screen, camera, optical scanner, network interface, modem, other known I/O devices or a combination of such I/O interface 1108. The touch screen may be activated with a stylus or a finger.

The I/O interface 1108 may include one or more devices for presenting output to a user, including, but not limited to, a graphics engine, a display (e.g., a display screen), one or more output providers (e.g., display providers), one or more audio speakers, and one or more audio providers. In certain embodiments, interface 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can comprise hardware, software, or both that connects components of computing device 1100 to each other.

Figure 12:
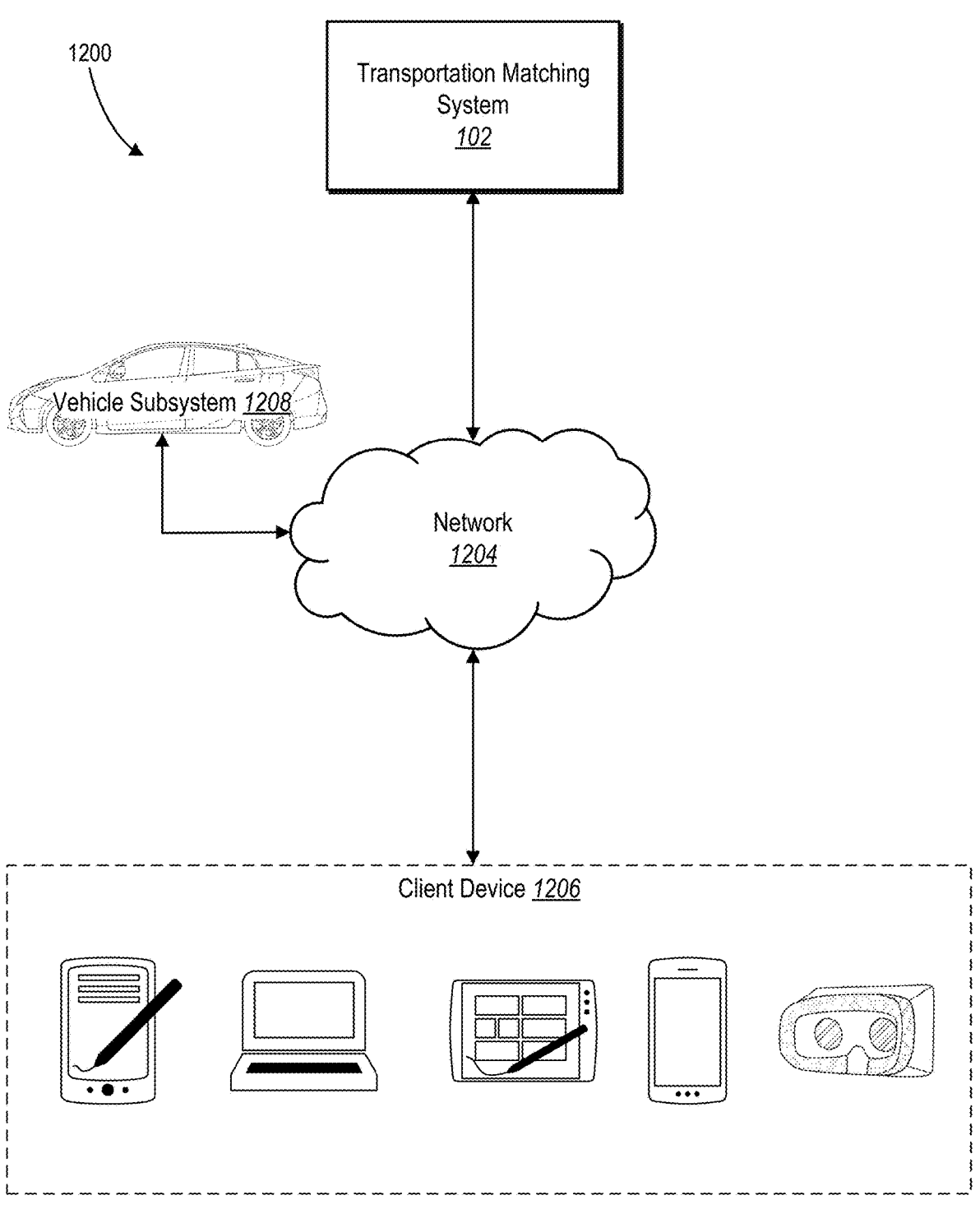
FIG. 12 illustrates an example environment for a transportation matching system in accordance with one or more embodiments.

FIG. 12 illustrates an example network environment 1200 of the transportation matching system 102. The network environment 1200 includes a client device 1206 (e.g., the provider devices 108a-108n or the requester device 112), a transportation matching system 102, and a vehicle subsystem 1208 connected to each other by a network 1204. Although FIG. 12 illustrates a particular arrangement of the client device 1206, the transportation matching system 102, the vehicle subsystem 1208, and the network 1204, this disclosure contemplates any suitable arrangement of client device 1206, the transportation matching system 102, the vehicle subsystem 1208, and the network 1204. As an example, and not by way of limitation, two or more of client device 1206, the transportation matching system 102, and the vehicle subsystem 1208 communicate directly, bypassing network 1204. As another example, two or more of client device 1206, the transportation matching system 102, and the vehicle subsystem 1208 may be physically or logically co-located with each other in whole or in part.

Moreover, although FIG. 12 illustrates a particular number of client devices 1206, transportation matching systems 102, vehicle subsystems 1208, and networks 1204, this disclosure contemplates any suitable number of client devices 1206, transportation matching system 102, vehicle subsystems 1208, and networks 1204. As an example, and not by way of limitation, network environment 1200 may include multiple client device 1206, transportation matching system 102, vehicle subsystems 1208, and/or networks 1204.

This disclosure contemplates any suitable network 1204. As an example, and not by way of limitation, one or more portions of network 1204 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1204 may include one or more networks 1204.

Links may connect client device 1206, request distribution system 104, and vehicle subsystem 1208 to network 1204 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by client device 1206. As an example, and not by way of limitation, a client device 1206 may include any of the computing devices discussed above in relation to FIG. 11. A client device 1206 may enable a network user at the client device 1206 to access network 1204. A client device 1206 may enable its user to communicate with other users at other client devices 1206.

In particular embodiments, the client device 1206 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1206 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1206 one or more Hyper Text Markup Language ("HTML") files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. The transportation matching system 102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 102. In addition, the transportation matching system 102 may manage identities of service requesters such as users/requesters. In particular, the transportation matching system 102 may maintain requester data such as driving/riding histories, personal data, or other user data in addition to navigation and/or traffic management services or other location services (e.g., GPS services).

In particular embodiments, the transportation matching system 102 may manage transportation matching services to connect a user/requester with a vehicle and/or provider. By managing the transportation matching services, the transportation matching system 102 can manage the distribution and allocation of resources from vehicle systems and user resources such as GPS location and availability indicators, as described herein.

The transportation matching system 102 may be accessed by the other components of network environment 1200 either directly or via network 1204. In particular embodiments, the transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a transportation matching system 102 to manage, retrieve, modify, add, or delete, the information stored in data store.

In particular embodiments, the transportation matching system 102 may provide users with the ability to take actions on various types of items or objects, supported by the transportation matching system 102. As an example, and not by way of limitation, the items and objects may include transportation matching networks to which users of the transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 102 or by an external system of a third-party system, which is separate from transportation matching system 102 and coupled to the transportation matching system 102 via a network 1204.

In particular embodiments, the transportation matching system 102 may be capable of linking a variety of entities. As an example, and not by way of limitation, the transportation matching system 102 may enable users to interact with each other or other entities, or to allow users to interact with these entities through an application programming interfaces ("API") or other communication channels.

In particular embodiments, the transportation matching system 102 may include a variety of servers, sub-systems, programs, modules, logs, and data stores. In particular embodiments, the transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The transportation matching system 102 may also include suitable components such as network interfaces, security mechanisms, load balancers, failover servers, management-and-network-operations consoles, other suitable components, or any suitable combination thereof. In particular embodiments, the transportation matching system 102 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the transportation matching system 102 and one or more client devices 1206. An action logger may be used to receive communications from a web server about a user's actions on or off the transportation matching system 102. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of the transportation matching system 102. A privacy setting of a user determines how particular information associated with a user can be shared. The authorization server may allow users to opt in to or opt out of having their actions logged by the transportation matching system 102 or shared with other systems, such as, for example, by setting appropriate privacy settings. Third-party-content-object stores may be used to store content objects received from third parties. Location stores may be used for storing location information received from client devices 1206 associated with users.

In addition, the vehicle subsystem 1208 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1208 can include an autonomous vehicle—e.g., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) can be mounted on the top of the vehicle subsystem 1208 or else can be located within the interior of the vehicle subsystem 1208. In certain embodiments, the sensor(s) can be located in multiple areas at once—e.g., split up throughout the vehicle subsystem 1208 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1208 may include a communication device capable of communicating with the client device 1206 and/or the request distribution system 104. For example, the vehicle subsystem 1208 can include an on-board computing device communicatively linked to the network 1204 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, from a first provider device, an indication of a selection of a first transportation mode from among a set of selectable transportation modes of a mobile application running on the first provider device;
   receiving, from a requester device, a transportation request corresponding to the first transportation mode of the first provider device;
   receiving, from a second provider device, an indication of a selection of a second transportation mode from among the set of selectable transportation modes of the mobile application, wherein the second transportation mode is different from the first transportation mode and sets the second provider device as a limited-eligibility provider device;
   determining that the transportation request is compatible with the first transportation mode of the first provider device and fails to satisfy matching criteria of the second transportation mode of the second provider device;
   determining, based on the transportation request failing to satisfy the matching criteria of the second transportation mode, an expected increase in network coverage time based on network coverage time providing the transportation request to the second provider device relative to network coverage time providing the transportation request to the first provider device; and
   providing, for display based on the expected increase in network coverage time, a transportation request notification to the second provider device running the mobile application in the second transportation mode, the transportation request notification indicating the transportation request from the requester device and including an option to change from the second transportation mode to the first transportation mode.

2. The computer-implemented method of claim 1, further comprising:
   modifying the second provider device, upon acceptance of the option to change from the second transportation mode to the first transportation mode, from the second transportation mode to the first transportation mode.

3. The computer-implemented method of claim 2, further comprising receiving, from the second provider device, the indication of the selection of the second transportation mode by determining that the second provider device is available to provide transportation services within a high value mode or a destination mode that is inconsistent with the transportation request.

4. The computer-implemented method of claim 2, further comprising identifying receiving, from the second provider device, the indication of the selection of the second transportation mode by determining that the second provider device is available to provide transportation services within an airport queue mode or a delivery mode that is inconsistent with the transportation request.

5. The computer-implemented method of claim 2, further comprising determining the expected increase in network coverage time by determining an expected change in transportation system provider hours for the second provider device based on providing the transportation request to the second provider device.

6. The computer-implemented method of claim 1, further comprising:

determining the expected increase in network coverage time by determining a signoff probability associated with the second provider device based on an idle time of the second provider device; and providing the transportation request notification to the second provider device based on the signoff probability.

7. The computer-implemented method of claim 1, further comprising:

determining a first arrival time for the first provider device to service the transportation request;

determining a second arrival time for the second provider device to service the transportation request; and providing the transportation request to the second provider device based on comparing the first arrival time and the second arrival time.

8. The computer-implemented method of claim 1, further comprising providing the transportation request notification to the second provider device by providing a status modification element or a transportation request acceptance element for display via the second provider device with a digital map indicating a location of the requester device.

9. A system comprising:

at least one processor; and a non-transitory computer readable medium comprising instructions that, when executed by the at least one processor, cause the system to:

receive, from a first provider device, an indication of a selection of a first transportation mode from among a set of selectable transportation modes of a mobile application running on the first provider device;

receive, from a requester device, a transportation request corresponding to the first transportation mode of the first provider device; receive, from a second provider device, an indication of a selection of a second transportation mode from among the set of selectable transportation modes of the mobile application, wherein the second transportation mode is different from the first transportation mode and sets the second provider device as a limited-eligibility provider device;

determine that the transportation request is compatible with the first transportation mode of the first provider device and fails to satisfy matching criteria of the second transportation mode of the second provider device;

determine, based on the transportation request failing to satisfy the matching criteria of the second transportation mode, an expected increase in network coverage time based on network coverage time providing the transportation request to the second provider device relative to network coverage time providing the transportation request to the first provider device; and provide, for display based on the expected increase in network coverage time, a transportation request notification to the second provider device running the mobile application in the second transportation mode, the transportation request notification indicating the transportation request from the requester device and including an option to change from the second transportation mode to the first transportation mode.

10. The system of claim 9, further comprising instructions that, when executed by the at least one processor, cause the system to:

receive the transportation request corresponding to the first transportation mode by receiving a transportation request for a standard transportation mode; and identify the first provider device by determining that the first provider device is available to provide transportation services within the standard transportation mode.

11. The system of claim 10, further comprising instructions that, when executed by the at least one processor, cause the system to receive, from a second provider device, an indication of a selection of a second transportation mode by determining that the second provider device is available to provide transportation services within a high value mode, a destination mode, or a delivery mode that is inconsistent with the transportation request.

12. The system of claim 10, further comprising instructions that, when executed by the at least one processor, cause the system to determine the expected increase in network coverage time by determining an expected change in transportation system provider hours for the second provider device based on providing the transportation request to the second provider device.

13. The system of claim 10, further comprising instructions that, when executed by the at least one processor, cause the system to:

determine a first arrival time for the first provider device to service the transportation request;

determine a second arrival time for the second provider device to service the transportation request; and provide the transportation request to the second provider device based on comparing the first arrival time and the second arrival time.

14. The system of claim 10, further comprising instructions that, when executed by the at least one processor, cause the system to provide the transportation request notification to the second provider device by providing a status modification element or a transportation request acceptance element for display via the second provider device with a digital map indicating a location of the requester device.

15. A non-transitory computer readable medium comprising instructions that, when executed by at least one processor, cause a computing device to:

receive, from a first provider device, an indication of a selection of a first transportation mode from among a set of selectable transportation modes of a mobile application running on the first provider device;

receive, from a requester device, a transportation request corresponding to the first transportation mode of the first provider device;

receive, from a second provider device, an indication of a selection of a second transportation mode from among the set of selectable transportation modes of the mobile application, wherein the second transportation mode is different from the first transportation mode and sets the second provider device as a limited-eligibility provider device;

determine that the transportation request is compatible with the first transportation mode of the first provider device and fails to satisfy matching criteria of the second transportation mode of the second provider device;

determine, based on the transportation request failing to satisfy the matching criteria of the second transportation mode, an expected increase in network coverage time based on network coverage time providing the transportation request to the second provider device relative to network coverage time providing the transportation request to the first provider device; and provide, for display based on the expected increase in network coverage time, a transportation request notification to the second provider device running the mobile application in the second transportation mode, the transportation request notification indicating the transportation request from the requester device and including an option to change from the second transportation mode to the first transportation mode.

16. The non-transitory computer readable medium of claim 15, further comprising instructions that, when executed by the at least one processor, cause the computing device to:

receive the transportation request corresponding to the first transportation mode by receiving a transportation request for a standard transportation mode; and identify the first provider device by determining that the first provider device is available to provide transportation services within the standard transportation mode.

17. The non-transitory computer readable medium of claim 16, further comprising instructions that, when executed by the at least one processor, cause the computing device to receive, from the second provider device, the indication of the selection of the second transportation mode by determining that the second provider device is available to provide transportation services within a high value mode, a destination mode, or a delivery mode that is inconsistent with the transportation request.

18. The non-transitory computer readable medium of claim 15, further comprising instructions that, when executed by the at least one processor, cause the computing device to determine the expected increase in network coverage time by determining an expected change in transportation system provider hours for the second provider device based on providing the transportation request to the second provider device.

19. The non-transitory computer readable medium of claim 15, further comprising instructions that, when executed by the at least one processor, cause the computing device to:

determine a first arrival time for the first provider device to service the transportation request;

determine a second arrival time for the second provider device to service the transportation request; and provide the transportation request to the second provider device based on comparing the first arrival time and the second arrival time.

20. The non-transitory computer readable medium of claim 15, further comprising instructions that, when executed by the at least one processor, cause the computing device to provide the transportation request notification to the second provider device by providing a status modification element or a transportation request acceptance element for display via the second provider device with a digital map indicating a location of the requester device.

* * * * *